(12) United States Patent
Sun

(10) Patent No.: US 9,339,846 B2
(45) Date of Patent: May 17, 2016

(54) ULTRASONIC SENSOR ASSEMBLY

(71) Applicant: HYUNDAI MOBIS CO., LTD, Yongin-si (KR)

(72) Inventor: Hae Young Sun, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 339 days.

(21) Appl. No.: 14/048,083

(22) Filed: Oct. 8, 2013

(65) Prior Publication Data
US 2015/0008796 A1 Jan. 8, 2015

(30) Foreign Application Priority Data
Jul. 2, 2013 (KR) .......................... 10-2013-0077271

(51) Int. Cl.
H01L 41/08 (2006.01)
B06B 1/06 (2006.01)
G01H 11/08 (2006.01)
G01S 15/93 (2006.01)
G01S 7/521 (2006.01)

(52) U.S. Cl.
CPC .............. B06B 1/0651 (2013.01); G01H 11/08 (2013.01); G01S 7/521 (2013.01); G01S 15/931 (2013.01)

(58) Field of Classification Search
CPC .... B06B 1/0651; G01H 11/08; G01S 15/631; G01S 7/1931; G01S 7/521
USPC ................ 310/334–336, 311; 73/514.34, 361
See application file for complete search history.

(56) References Cited

U.S. PATENT DOCUMENTS

| 5,834,650 A * | 11/1998 | Kim ................................. 73/651 |
| 6,520,019 B1 * | 2/2003 | Schon et al. .................... 310/336 |
| 9,003,887 B2 * | 4/2015 | Matsumoto .................... 310/324 |
| 2008/0084802 A1 * | 4/2008 | Baumgarte ................ 369/53.15 |
| 2008/0168841 A1 * | 7/2008 | Matsuo ........................... 73/649 |

FOREIGN PATENT DOCUMENTS

| JP | 3180034 U | 11/2012 |
| KR | 20-0348453 Y1 | 4/2004 |
| KR | 10-1042041 | 6/2011 |
| KR | 10-2013-0052860 A | 5/2013 |
| KR | 10-2013-0057798 A | 6/2013 |

* cited by examiner

Primary Examiner — Thomas Dougherty
Assistant Examiner — Karen B Addison
(74) Attorney, Agent, or Firm — NSIP Law

(57) ABSTRACT

Provided is an ultrasonic sensor assembly. The present invention simplifies an assembly structure of the ultrasonic sensor assembly, and thus enables a process of the ultrasonic sensor assembly to be performed as an automation process.

13 Claims, 13 Drawing Sheets

B-B'

C-C'

D-D'

ULTRASONIC SENSOR ASSEMBLY

CROSS-REFERENCE TO RELATED APPLICATIONS

This application claims priority under 35 U.S.C. §119 to Korean Patent Application No. 10-2013-0077271, filed on Jul. 2, 2013, the disclosure of which is incorporated herein by reference in its entirety.

TECHNICAL FIELD

The present invention relates to a sensor assembly, and more particularly, to a sensor assembly in which a top of a housing is opened, and thus, elements configuring a sensor can be easily assembled.

BACKGROUND

Generally, two types of sensors (for example, piezo-electric type sensors and magnerostriction type sensors) are being mainly used as ultrasonic sensors.

The piezo-electric type sensors denote sensors in which a voltage is induced by applying a pressure to an object such as a quartz crystal, a piezo-electric material (for example, PZT), or a piezo-electric polymer, but a vibration is caused by applying a voltage to the object. The magnerostriction type sensors denote sensors that use the joule effect (in which a vibration is caused by applying a magnetic field) and the villari effect (in which a magnetic field is generated by applying a stress) which are shown in an alloy of iron, nickel, and cobalt.

The ultrasonic sensors use an element, having the piezo-electric characteristic and the magnerostriction characteristic, as a vibration source. Fast vibrations equal to the number of frequencies are caused by applying high-frequency electric energy to a ceramic element, in which case when the applied frequency is 20 KHz or higher, the ceramic element generates an inaudible ultrasonic wave having a specific frequency band according to the vibrations.

Especially, sensors using a piezo-electric element sense an object by using an ultrasonic wave generated by the piezo-electric element, and specifically, the sensors intermittently transmit an ultrasonic pulse signal to receive a reflected wave from a nearby obstacle, thereby sensing the object.

The ultrasonic sensor is used for back sonars and corner sonars of vehicles and parking spot sensors that detect whether there is a space between a corresponding vehicle and an obstacle such as a side wall in column parking.

The ultrasonic sensor, as illustrated in FIG. 1, includes a case 110 that accommodates various components, a piezo-electric element 20 that is accommodated in the case 10, a printed circuit board (PCB) 30, a lead wire 40 that is connected to the piezo-electric element 20 at one end of the lead wire 40 and connected to the PCB 30 at the other end, a sound absorbing material 50 that maintains a constant attenuation of a vibration of the case 10, and a charging material 60 that seals the inside of the case 10.

In the case 10, the piezo-electric element 20 is disposed at and adhered to a bottom of the case 10, one of the lead wire 40 is connected to the case 10, and the sound-absorbing material 50 is assembled on the piezo-electric element 20.

In this state, when the sound-absorbing material 50 directly contacts the piezo-electric element 20, the sound-absorbing material 50 can affect a vibration characteristic of the piezo-electric element 20, and the case 10 has a structure in which the piezo-electric element 20 is separated from the sound-absorbing material 50.

Therefore, in order to separate the piezo-electric element 20 and the sound-absorbing material 50, the charging material 60 is coated and hardened near the piezo-electric element 20 to form a mounting part 70 having a height higher than the piezo-electric element 20, and the sound-absorbing material 50 is assembled to the mounting part 70.

Here, a connection path to the PCB 30 is provided by connecting the lead wire 40 and a connection component 80, and the charging material 60 or the like is charged into the case 10.

The connection path to the PCB 30 has a case in which the lead wire 40 and a connector 90 are applied and a case in which a pin type is provided.

The lead wire 40 has a type in which the connector 90 is connected to a distal end of each of a power line and a ground line. However, since an automation process for the lead wire 40 is impossible, the lead wire 40 is provided to have a length longer than a real connection distance in consideration of a manual process.

In the pin type, a power pin and a ground pin are provided in plurality, the pins may be directly connected to the PCB 30.

In this case, each of the pins is provided at an accurate position. To this end, a component or a structure for fixing each of the pins is needed.

However, when external power is applied to the case 10 itself and other components, a vibration characteristic can be affected by the external power.

Therefore, the case 10 has an anti-vibration structure in which external power or a vibration applied to the pins is not transferred to the case 10 and the other components.

As described above, since a structure of the sensor assembly is complicated and an overall process for the sensor assembly is performed manually, it is difficult to accurately assemble a sensor.

Particularly, when connecting the PCB 30 to the connection component 80 for the lead wire 40, it is impossible to align the lead wire 40 and maintain an alignment state of the lead wire 40, and thus, a manual process of connecting the lead wire 40 and the PCB 30 is inevitably performed.

In addition, in an ultrasonic wave transceiver including the case 10, the piezo-electric element 20, the lead wire 40, and the sound-absorbing material 50, since a process of coating and hardening the charging material 60 for providing the mounting part 70 with the sound-absorbing material 50 disposed therein is repeatedly performed, many processes are performed, causing an increase in manufacturing cost.

PRIOR ART REFERENCE

Patent Document

Korean Patent Publication No. 2010-0063866 (Jun. 14, 2010)

SUMMARY

Accordingly, the present invention provides an ultrasonic sensor assembly that is simplified in structure and thus is easy to assemble.

In one general aspect, an ultrasonic sensor assembly includes: a hollow housing, a through hole being through-formed at one end of the housing, and an accommodating port being formed to be opened at the other end; a case inserted into and disposed at the through hole; a fixing member disposed between one end inner circumference surface of the housing and an outer circumference surface of the case to couple the case to the housing; a front supporting cover configured to include a side wall that is coupled to one end outer circumference surface of the housing and a supporting part that is formed to be bent in a direction from the side wall to the case and supports one surface of the fixing member; a piezoelectric element mounted on an inner bottom portion formed at one end of the case; a printed circuit board (PCB) disposed in the housing; a connection member, one end of the connection member being electrically connected to the piezo-electric element, and the other end being connected to an extension pin; and a sound-absorbing material charged into the case, wherein, an inner diameter of the supporting part is formed less than a maximum diameter of the fixing member, and one surface of the fixing member is supported by the supporting part, thereby preventing the case coupled to the fixing member from deviating in one end direction of the housing, and the extension pin is inserted into the housing in a state in which one end and the other end of the extension pin are exposed from the housing, the one end of the extension pin is connected to the connection member, and the other end of the extension pin is connected to the PCB.

The ultrasonic sensor assembly may further include a covering member coupled to the other end of the housing to seal an inside of the housing.

The ultrasonic sensor assembly may further include a catching jaw formed in the housing to protrude in an inner direction of the housing, wherein the fixing member contacts the catching jaw to prevent the fixing member and the case from deviating in the other end direction of the housing.

The ultrasonic sensor assembly may further include a bezel formed at the other end of the case to protrude outward, wherein the fixing member is formed of an elastic material, and an inserting groove with the bezel inserted thereinto is formed at the fixing member.

The ultrasonic sensor assembly may further include a catching jaw formed in the housing to protrude an inner direction of the housing, and configured to prevent the fixing member from deviating in the other end direction of the housing.

The fixing member may include: an extension part disposed between an inner circumference surface of the supporting part and an outer circumference surface of the case; and a mounting part provided at the other end of the extension part, the inserting groove being formed at an inner surface of the mounting part, one end of the mounting part being supported in contact with the supporting part, an outer circumference surface of the mounting part contacting an inner surface of the housing, and the other end of the mounting part being supported in contact with the catching jaw.

The ultrasonic sensor assembly may further include: a coupling groove formed at one of one end direction inner surface of the housing and an outer circumference surface of the fixing member; and a coupling projection formed at the other of the one end direction inner surface of the housing and the outer circumference surface of the fixing member, the coupling groove being inserted into the coupling projection.

Each of the coupling groove and the coupling projection may be formed in a ring shape.

The ultrasonic sensor assembly may further include a ring rubber coupled to one end outer circumference surface of the case which protrudes from the through hole of the housing, wherein an inner surface of the ring rubber contacts one end direction outer circumference surface of the case, and the other end surface of the ring rubber contacts the supporting part.

The ring rubber may be formed in a truncated-cone shape in which one end and the other end of the ring rubber pass through each other, and a diameter of the one end is less than a diameter of the other end.

The ultrasonic sensor assembly may further include a communication hole formed at the other end of the fixing member to communicate an inside of the case with the accommodating port, wherein the case may be formed to be opened in a direction of the accommodating port of the housing.

Each of the coupling groove and the coupling projection may be formed as at least two or more.

The through hole may be formed in a circular shape.

Other features and aspects will be apparent from the following detailed description, the drawings, and the claims.

DETAILED DESCRIPTION OF EMBODIMENTS

According to the present invention, the other end direction of a case is opened to communicate with the inside of a housing, an accommodating port is opened and formed in the other end direction of the housing, and various elements, such as a piezo-electric element, a connection member, etc., are sequentially accommodated in the housing through the accommodating port. Accordingly, an assembly structure for assembling a sensor can be simplified, and thus, a sensor assembling process can be performed as an automation process.

Hereinafter, embodiments of the present invention will be described in detail with reference to the accompanying drawings.

First Embodiment

Figure 1:
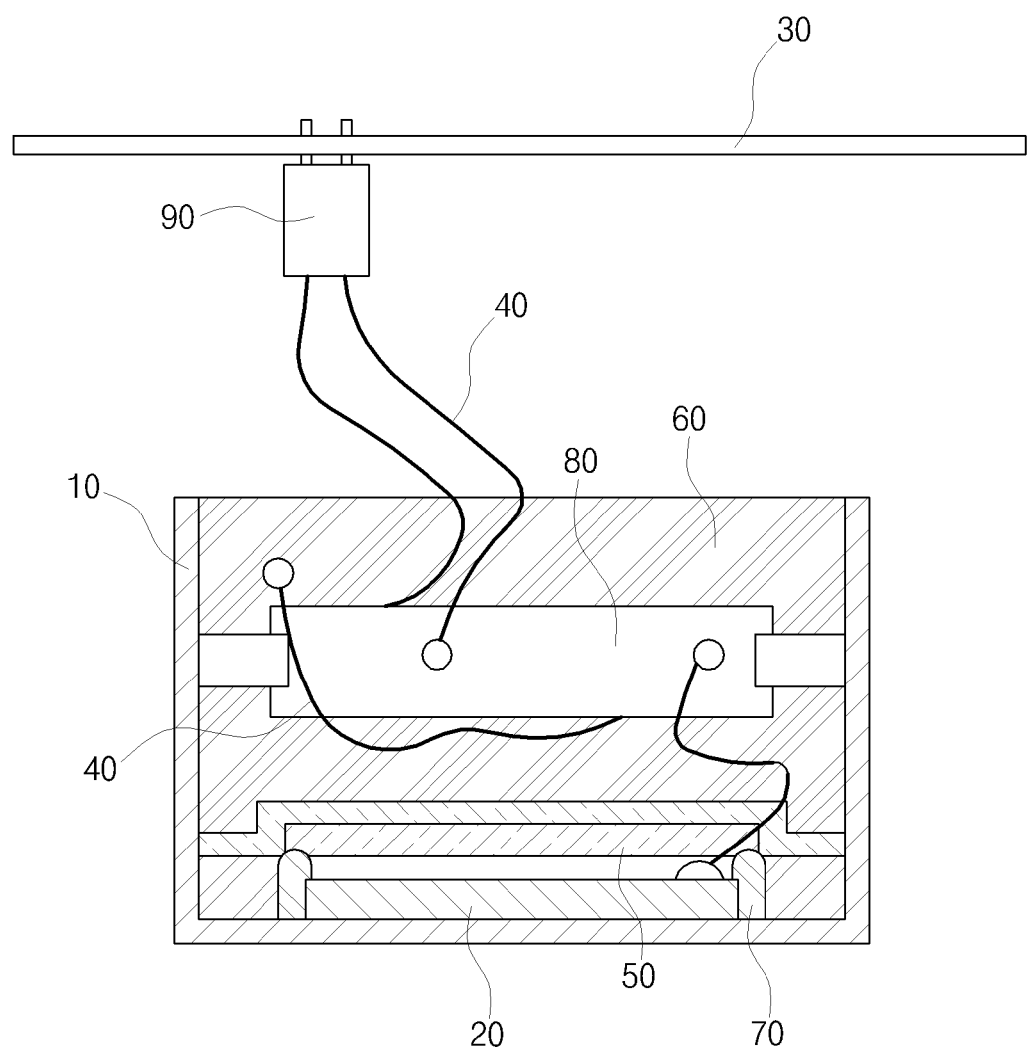
FIG. 1 is a cross-sectional view illustrating an ultrasonic sensor assembly of the related art.
Figure 2:
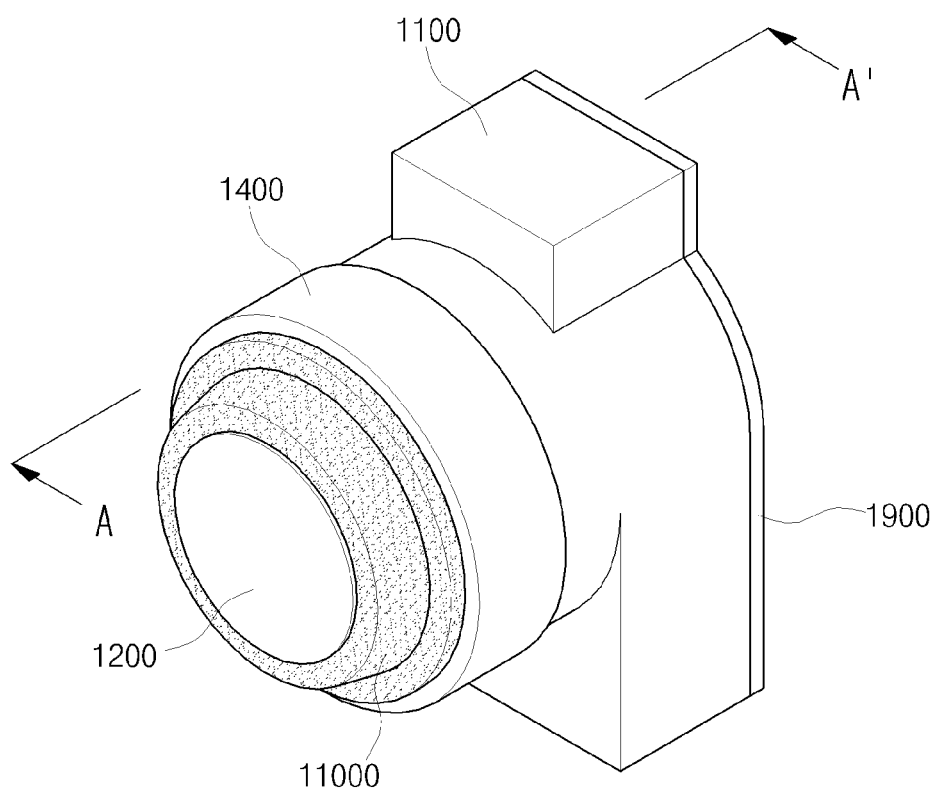
FIG. 2 is a perspective view illustrating an ultrasonic sensor assembly according to a first embodiment of the present invention.
Figure 3:
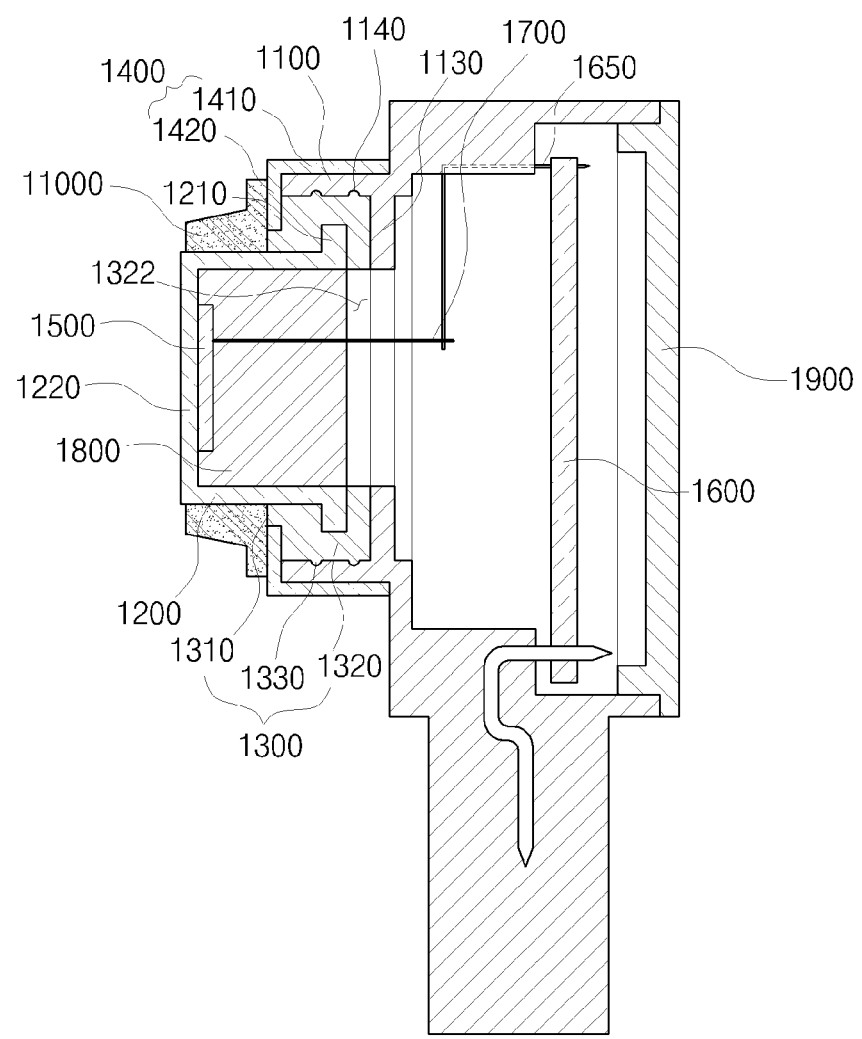
FIG. 3 is a cross-sectional view taken along line A-A' of FIG. 2.
Figure 4:
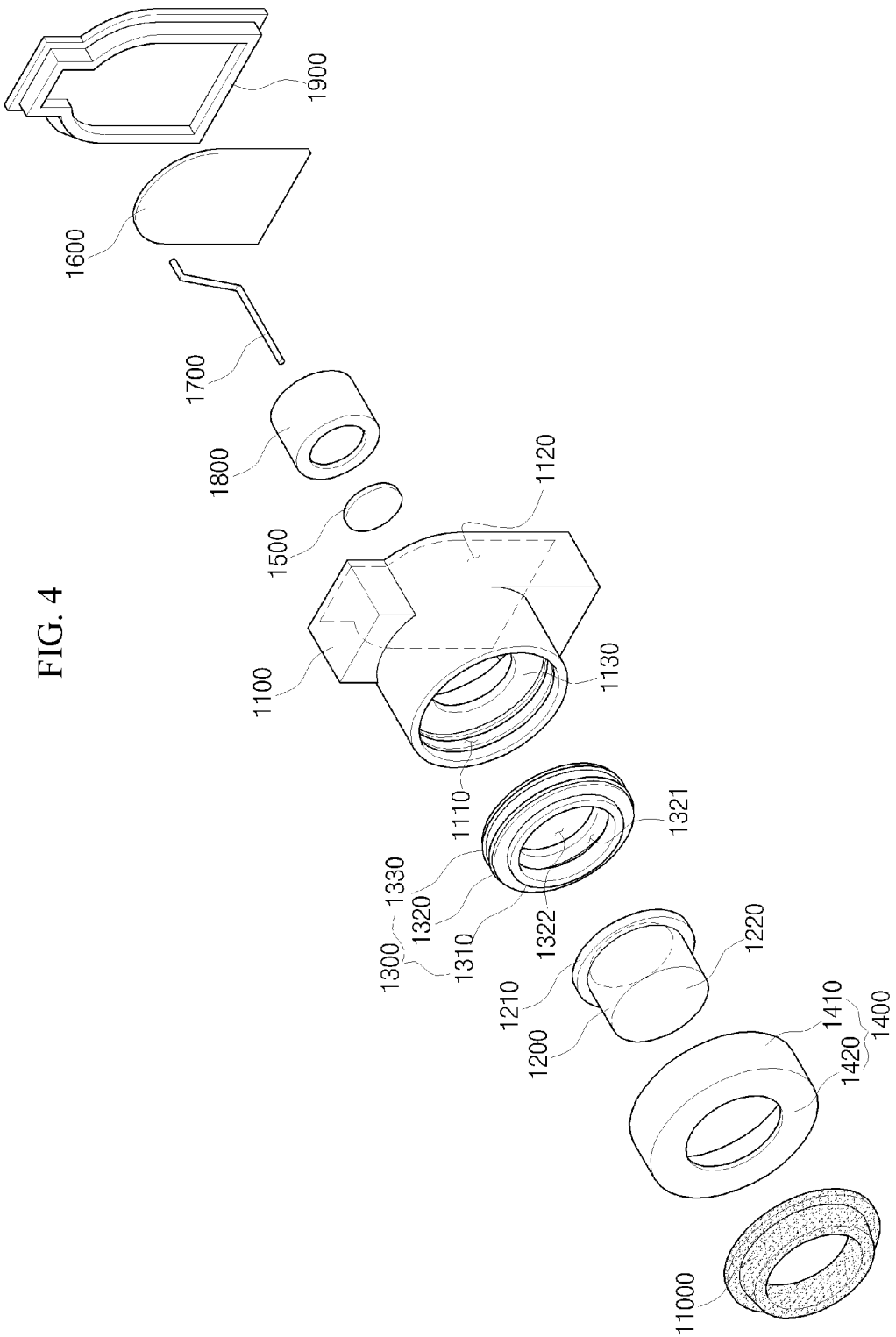
FIG. 4 is an exploded perspective view illustrating the ultrasonic sensor assembly according to the first embodiment of the present invention.

FIG. 2 is a perspective view illustrating an ultrasonic sensor assembly according to a first embodiment of the present invention, FIG. 3 is a cross-sectional view taken along line A-A' of FIG. 2, and FIG. 4 is an exploded perspective view illustrating the ultrasonic sensor assembly according to the first embodiment of the present invention.

Referring to FIGS. 2 to 4, the ultrasonic sensor assembly according to the first embodiment of the present invention includes a housing 1100 that configures a body, a case 1200 that is disposed in the housing 1100, a fixing member 1300 that couples the case 1200 to the housing 1100, a front supporting cover 1400 that is coupled to one end of the housing 1100 and supports the fixing member 1300, a piezo-electric element 1500 that is mounted on an inner bottom portion 1220 formed at one end of the case 1200, a PCB 1600 that is disposed in the housing 1100, an extension pin 1650 that is connected to the PCB 1600, a connection member 1700 that is electrically connected to the piezo-electric element 1500 at one end of the connection member 1700 and connected to the extension pin 1650 at the other end of the connection member 1700, a sound-absorbing material 1800 that is charged into the case 1200, a covering member 1900 that seals the inside of the housing 1100, and a ring rubber 11000 that is disposed in one end direction of the housing 1100.

The housing 1100 is the body that accommodates the case 1200 and various elements. A through hole 1110 is formed in the one end direction of the housing 1100, and a coupling groove 1140 for coupling the case 1200 is formed in a ring shape at a position, which is separated in the other end direction of the housing 1100 from the through hole 1110, and at an inner side of the housing 1100. The housing 1110 is provided in a hollow shape in which the accommodating port 1120 is opened and formed, in the other end direction of the housing 1100.

The through hole 1110 is preferably formed in a circular shape, and is a hole in which the case 1200 is inserted into the housing 1100 through the through hole 1110, and the case 1200 is exposed from the housing 1100.

Therefore, the case 1200 is inserted into the through hole 1110, and the case 1200 is exposed to the outside of the housing 1100 through the through hole 1110. Thus, the through hole 1110 enables a signal, which is transmitted/received from the outside of the housing 1100 to the case 1200, to be clearly transmitted/received.

The accommodating port 1120 is a hole into which the piezo-electric element 1500 and various elements are inserted from the outside of the housing 1100.

Therefore, the one end direction and other end direction of the housing 1100 communicate with each other through the through hole 1110 and the accommodating port 1120.

Here, the case 1200 inserted through the through hole 1110 is supported by a catching jaw 1130 that is protrusion-formed at a distance separated from the through hole 1110 in the other direction of the housing 1100.

The catching jaw 1130 is formed to protrude in an inner direction of the housing 1100, and preferably, at the right angle from an inner surface of the housing 1100, at an inner circumference of the housing 1100.

The case 1200 inserted through the through hole 1110 is caught at the catching jaw 1130 in a state in which the case 1200 is exposed to the through hole 1110, and the catching jaw 1130 prevents the case 1200 from deviating in the other end direction of the housing 1100.

The case 1200 is preferably formed in a cylindrical shape to be inserted into the through hole 1110, and the one end direction of the case 1200 is exposed from the through hole 1110.

The other end of the case 1200 is opened and formed in the accommodating port 1120 direction of the housing 1100 to communicate with the inside of the housing 1100, and a bezel 1210 is formed therein.

The bezel 1210 is formed to protrude outward from the other end circumference of the case 1200, and the fixing member 1300 is coupled thereto.

The fixing member 1300 couples the case 1200 to the housing 1100, and is preferably formed of an elastic material. The fixing member 1300 is formed in a cylindrical shape to be coupled to the bezel 1210 of the case 1200, and a mounting part 1320 is provided at an inner side of the fixing member 1300. Thus, the bezel 1210 of the case 1200 is inserted into the mounting part 1320.

The maximum diameter of the fixing member 1300 is formed greater than an inner diameter of the catching jaw 1130.

Therefore, since the maximum diameter of the fixing member 1300 is greater than the inner diameter of the catching jaw 1130, the other surface of the fixing member 1300 is supported in contact with one surface of the catching jaw 1130, thereby preventing the fixing member 1300 from deviating in the other end direction of the housing 1100.

The fixing member 1300 includes an extension part 1310, which is disposed between an inner circumference surface of the front supporting cover 1400 and an outer circumference surface of the case 1200, and the mounting part 1320 that is disposed at the other end of the extension part 1310.

The extension part 1310 that extends in one end direction of the fixing member 1300, and is disposed between an inner circumference surface of the front supporting cover 1400 and an outer circumference surface of the case 1200.

Therefore, the extension part 1310 is disposed between the inner circumference surface of the front supporting cover 1400 and the outer circumference surface of the case 1200, and a side surface of the extension part 1310 contacts an inner surface of the front supporting cover 1400, thus preventing the outer circumference surface of the case 1200 from being damaged by a collision between the inner surface of the front supporting cover 1400 and the outer circumference surface of the case 1200.

The mounting part 1320 is provided in the other end direction of the extension part 1310, and the bezel 1210 is coupled to the mounting part 1320 included in the fixing member 1300, thereby enabling the case 1200 to be fixed in one end direction of the housing 1100.

In more detail, one end of the mounting part 1320 is provided to protrude outward from the other end circumference of the extension part 1310, and supported in contact with the front supporting cover 1400.

Moreover, an outer circumference surface of the mounting part 1320 extends from the one end of the mounting part 1320 to the other end direction of the housing 1100 to contact the inner surface of the housing 1100, and a coupling projection 1330 corresponding to the coupling groove 1140 of the housing 1100 is formed at the outer circumference surface of the mounting part 1320 to be coupled to the housing 1100.

Here, the coupling projection 1330 is formed in a ring shape corresponding to the coupling groove 1140 of the housing 1100, at the outer circumference surface of the fixing member 1300, and thus, the coupling of the coupling groove 1140 and the coupling projection 1330 prevents the fixing member 1300 and the case 1200 coupled to the fixing member 1300 from freely moving inside the housing 1100.

Although it is illustrated in the drawing that the coupling groove 1140 is formed at the inner surface of the housing 1100 and the coupling projection 1330 is formed at the outer circumference surface of the fixing member 1300, when the housing 1100 and the fixing member 1300 are coupled and fixed to each other, the coupling projection 1330 may be formed at the inner side of the housing 1100, and the coupling groove 1140 may be formed at the outer circumference surface of the fixing member 1300.

Moreover, although it is illustrated in the drawing that the coupling groove 1140 is formed at the inner surface of the housing 1100, without the coupling groove 1140 being formed at the inner surface of the housing 1100, the coupling projection 1330 formed at the outer circumference surface of the fixing member 1300 can solely prevent the fixing member 1300 from deviating from the housing 1100.

In more detail, the fixing member 1300 formed of an elastic material has the maximum diameter greater than the inner surface of the housing 1100, and thus, when the fixing member 1300 is inserted into the housing 1100, the coupling projection 1330 of the fixing member 1300 pressurizes the inner surface of the housing 1100, whereby the outer circumference surface of the fixing member 1300 is closely adhered to the inner surface of the housing 1100 by pressurization power of the fixing member 1300.

Therefore, even without the coupling groove 1140 being formed at the inner surface of the housing 1100, the pressurization power of the fixing member 1300 formed of an elastic material can prevent the fixing member 1300 from deviating from the housing 1100.

In addition, it is illustrated in the drawing that each of the coupling groove 1140 and the coupling projection 1330 is formed as two at an inner circumference surface of the housing 1100 or at an outer circumference surface of the fixing member 1300, but if the fixing member 1300 is prevented from deviating from the housing 1100, each of the coupling groove 1140 and the coupling projection 1330 is formed as at least two or more.

The other end of the mounting part 1320 is formed to protrude in a direction from the outer circumference surface to the inner side of the mounting part 1320, and contacts the catching jaw 1130 of the housing 1100. A communication hole 1322 through which the inside of the case 1200 communicates with the inside of the housing 1100 is formed to pass through the other end of the mounting part 1320.

Therefore, the mounting part 1320 is provided at the fixing member 1300 by the one end, outer circumference surface, and other end of the mounting part 1320, and the bezel 1210 is inserted by the mounting part 1320. Thus, the case 1200 is coupled to the fixing member 1300.

Further, the other end of the mounting part 1320 of the fixing member 1300 is supported in contact with the catching jaw 1130 that protrudes in the inner direction of the housing 1100, and thus, the fixing member 1300 and the case 1200 coupled to the fixing member 1300 are prevented from deviating in the other end direction of the housing 1100.

Moreover, the fixing member 1300 is formed an elastic material, and thus, when the case 1200 is coupled to the fixing member 1300, the case 1200 can be easily can be coupled to the fixing member 1300 by an elasticity of the elastic material of the fixing member 1300, and the front supporting cover 1400 prevents the fixing member 1300 from deviating in the one end direction of the housing 1100.

The front supporting cover 1400 is coupled to the one end circumference surface of the housing 1100 to prevent the case 1200 from deviating in the one end direction of the housing 1100. Preferably, the front supporting cover 140 is provided in a cylindrical shape to be coupled to the one end of the housing 1100, and includes a side wall 1410 and a supporting part 1420.

The side wall 1410 contacts the one end circumference surface of the housing 1100, and couples the front supporting cover 1400 to the housing 1100.

The supporting part 1420 is bent in a direction from the side wall 1410 to the case 1200 to support one surface of the fixing member 1300.

In more detail, an inner diameter of the supporting part 1420 is formed less than the maximum diameter of the fixing member 1300, and thus, the other surface of the supporting part 1420 supports the one surface of the fixing member to prevent the fixing member 1300 and the case 1200 coupled to the fixing member 1300 from deviating in the one end direction of the housing 1100.

In addition, the communication hole 1322 having the same size as the inner diameter of the case 1200 is formed at the other end of the fixing member 1300, and thus, the inside of the case 1200 communicates with the inside of the housing 1100, whereby the piezo-electric element 1500 and the connection member 1700 are accommodated in the case 1200 through the accommodating port 1120 of the housing 1100.

The piezo-electric element 1500 is mounted on the inner bottom portion 1220 formed at the one end of the case 1200, and has the principle that generates a vibration when an electrical signal having a constant or irregular pulse type is applied thereto.

Therefore, an ultrasonic wave is generated and transmitted by a friction (caused by the vibration of the piezo-electric element 1500) between the bottom portion 1220 of the case 1200 and the piezo-electric element 1500, and reflected back from an obstacle near the housing 1100, whereupon the reflected ultrasonic wave is transferred to the PCB 1600.

The PCB 1600 is inserted into the housing 1100 through the accommodating port 1120 of the housing 1100, and a conductive pattern is formed at one side surface or both side surfaces of the PCB 1600. Various circuit elements are mounted on the PCB 1600.

The PCB 1600 may be electrically connected to the connection member 1700 by bonding with the extension pin 1650, and the circuit elements may be mounted on the PCB 1600 by a flip chip type using a conductive adhesive depending on a type of the PCB 1600.

The extension pin 1650 is mounted on the housing 1100, and preferably, mounted in an insert type in a state in which one end and the other end of the extension pin 1650 are exposed.

Therefore, the extension pin 1650 is inserted into the housing 1100 in a state in which the one end and other end of the extension pin 1650 are exposed, and thus, a movement of the extension pin 1650 is limited. Therefore, when the extension pin 1650 is connected to the PCB 1600, the one end of the extension pin 1650 is connected to an accurate position, and the other end of the extension pin 1650 is connected to the connection member 1700. Accordingly, the connection member 1700 can be aligned with the PCB 1600 and can maintain an alignment state by the extension pin 1650 fixed to the housing 1100, and thus can be electrically and accurately connected to the PCB 1600.

The connection member 1700 is inserted into the housing 1100 through the accommodating port 1120 of the housing 1100. The one end of the connection member 1700 is electrically connected to the piezo-electric element 1500, and the other end of the connection member 1700 is connected to the extension pin 1650.

The connection member 1700 is preferably provided as one member. When power is applied to the ultrasonic sensor, the piezo-electric element 1500 vibrates to generate an ultrasonic wave, receives the ultrasonic wave reflected back from an obstacle near the housing 1100 to generate a signal, and transfers the generated signal to the PCB 1600 through the extension pin 1650.

Here, when the connection member 1700 can transfer an ultrasonic wave signal generated by the ultrasonic sensor to the PCB 1600, the connection member 1700 may be configured with a lead wire or a flexible printed circuit.

The sound-absorbing material 1800 may be preferably formed by adding a material such as a foaming agent. The sound-absorbing material 1800 is formed and hardened in an internal space of the case 1200 through the other opened end of the case 1200.

Here, when manufacturing the sound-absorbing material 1800, the foaming agent generates a bubble in the sound-absorbing material 1800 to form a hole (caused by a bubble mark) in the sound-absorbing material 1800, ultrasonic waves transferred to the sound-absorbing material 1800 are distributed by the hole formed in the sound-absorbing material 1800, and are prevented from being transferred in the other end direction of the housing 1100.

Moreover, the sound-absorbing material 1800 is charged into and hardened in the internal space of the case 1200, thereby sealing the inside of the case 1200.

Unlike the related art in which the ultrasonic sensor assembly is configured with the case 10, the piezo-electric element 20, the lead wire 40, the sound-absorbing material 50, etc. and a process of coating and hardening the charging material 60 for providing the mounting part 70 with the sound-absorbing material 50 disposed therein is repeatedly performed, the present invention forms and hardens the sound-absorbing material 1800 of the foaming agent at the other opened end of the case 1200, and thus, the sound-absorbing material 1800 can act as both the charging material 60 and the sound-absorbing material 50.

That is, the sound-absorbing material 1800 of the present invention can prevent the number of processes and the manufacturing cost from increasing due to the repeated coating and hardening process of the related art, thus reducing the number of processes and the manufacturing cost.

The covering member 1900 is disposed at the accommodating port 1120 of the housing 1100, and seals the inside of the housing 1100.

Therefore, the covering member 1900 can protect the internal elements of the housing 1100 against a foreign material penetrating from outside the housing 1100, thus extending a service life of the ultrasonic sensor assembly.

The ring rubber 11000 is formed in a truncated-cone shape in which one end and the other end of the ring rubber 11000 pass through each other, and a diameter of the one end is less than that of the other end. The ring rubber 11000 is coupled to the one end circumference surface of the case 1200 protruding from the through hole 1110 of the housing 1100. An inner surface of the ring rubber 11000 contacts the one end direction circumference surface of the case 1200, and the other surface of the ring rubber 11000 contacts the housing 1100 and one surface of the fixing member 1300.

Therefore, the ring rubber 11000 is coupled to the one end direction circumference surface of the case 1200, and thus can protect the case 1200 exposed from the housing 1100 against an external impact and prevent a foreign material from penetrating into the housing 1100.

As described above, various elements, such as the piezo-electric element 1500, the connection member 1700, etc., are sequentially accommodated in the housing 1100 through the accommodating port 1120 of the housing 1100, and thus, a process of assembling a sensor can be simplified, and an automation process of assembling the sensor can be performed.

A detailed assembly process of the present invention is as follows.

First, the piezo-electric 1500 is mounted on the inner bottom portion 1220 of the case 1200, and the fixing member 1300 is coupled to the case 1200 with the piezo-electric element 1500 mounted thereon.

The case 1200 with the fixing member 1300 coupled thereto is inserted into the housing 1100 through the through hole 1110 of the housing 1100 in a state in which the one end of the case 1200 is exposed from the through hole 1110.

At this time, the catching jaw 1130 is formed at the housing 1100, and the fixing member 1300 is caught at the catching jaw 1130 in the other end direction of the housing 1100, thus preventing the case 1200 coupled to the fixing member 1300 from deviating in the other end direction of the housing 1100.

Subsequently, the front supporting cover 1400 is coupled to the one end direction circumference surface of the housing 1100. When the front supporting cover 1400 is coupled to the housing 1100, the supporting part 1420 of the front supporting cover 1400 contacts the one end of the housing 1100 and the one end of the fixing part 1300, and thus prevents the fixing member 1300 and the case 1200 coupled to the fixing member 1300 from deviating in the one end direction of the housing 1100.

Subsequently, the sound-absorbing material 1800 is charged into and hardened in the internal space of the case 1200, thereby sealing the inside of the case 1200.

Then, the inside of the housing 1100 is sealed by coupling the covering member 1900 to the other end of the housing 1100, and the ring rubber 11000 is coupled to the outer circumference surface of the case 1200 exposed in the one end direction of the housing 1100.

Therefore, a structure for assembling the sensor is simple, and the elements accommodated in the case 1200 are accommodated sequentially in a direction from the other end to the one end of the housing 1100 through the accommodating port 1120 of the housing 1100 and the communication hole 1322 of the fixing member 1300, and thus, an automation process of assembling the sensor can be performed.

Moreover, the connection member 1700 is aligned with the PCB 1600, and it is possible to maintain an alignment state. Accordingly, the connection member 1700 can be accurately assembled to the PCB 1600.

Further, the catching jaw 1130 is formed at the inner surface of the housing 1100, and the fixing member 1300 contacts the catching jaw 1130, thus preventing the fixing member 1300 and the case 1200 coupled to the fixing member 1300 from deviating in the other end direction of the housing 1100.

Second Embodiment

Figure 5:
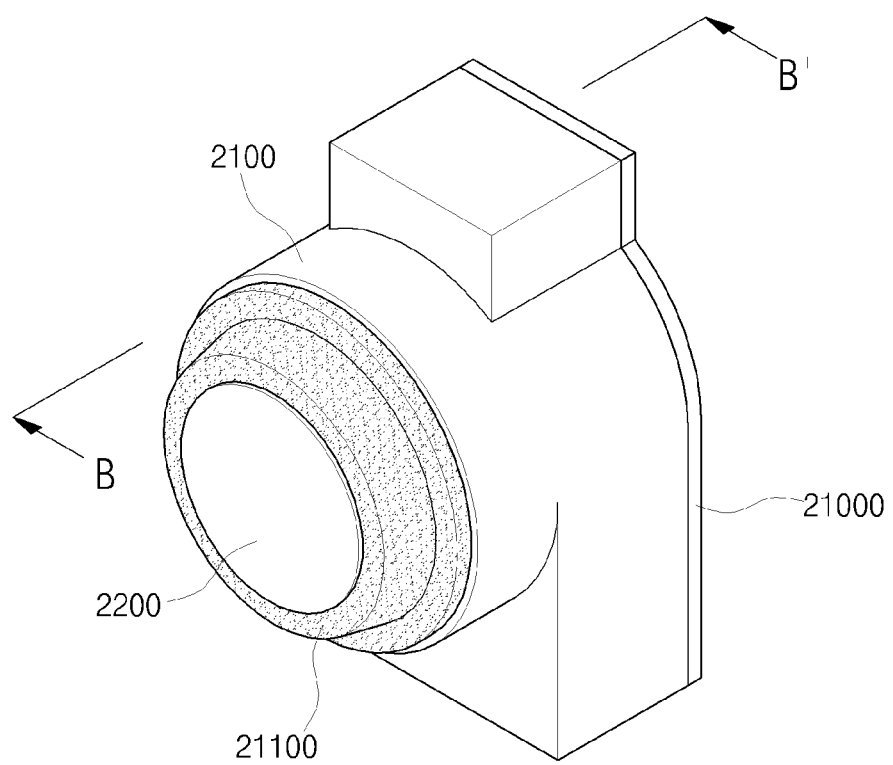
FIG. 5 is a perspective view illustrating an ultrasonic sensor assembly according to a second embodiment of the present invention.
Figure 6:
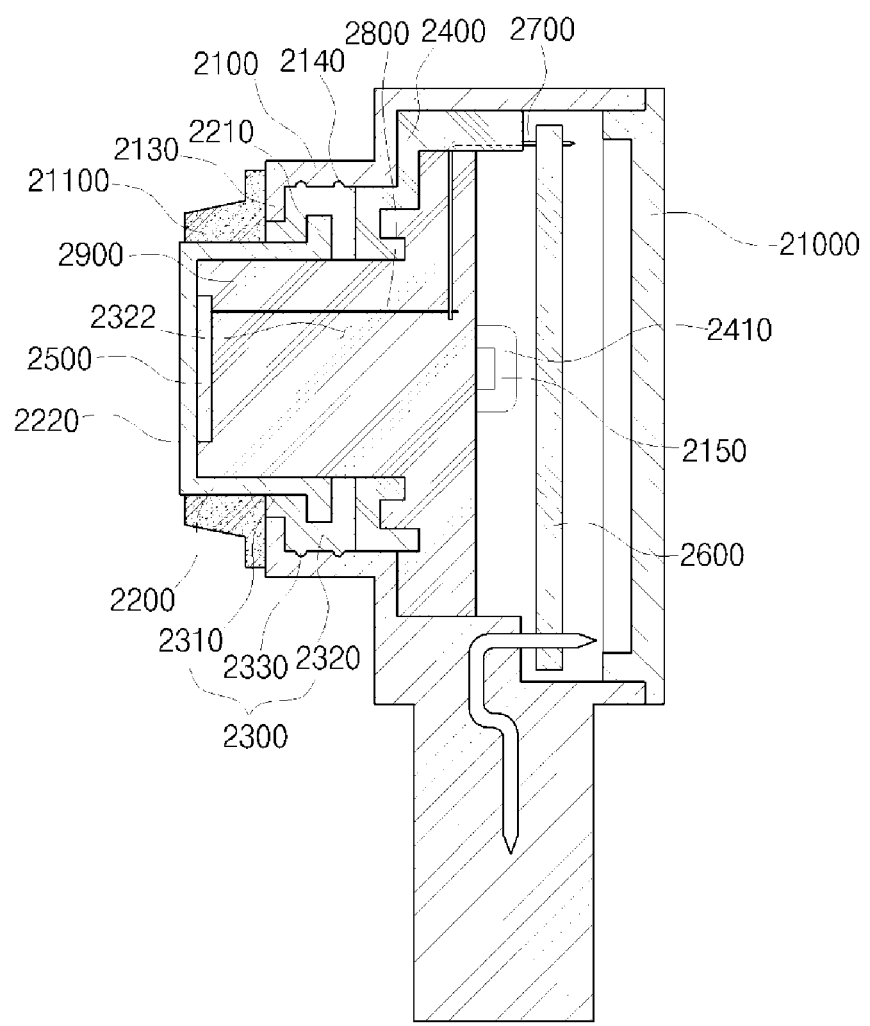
FIG. 6 is a cross-sectional view taken along line B-B' of FIG. 5.
Figure 7:
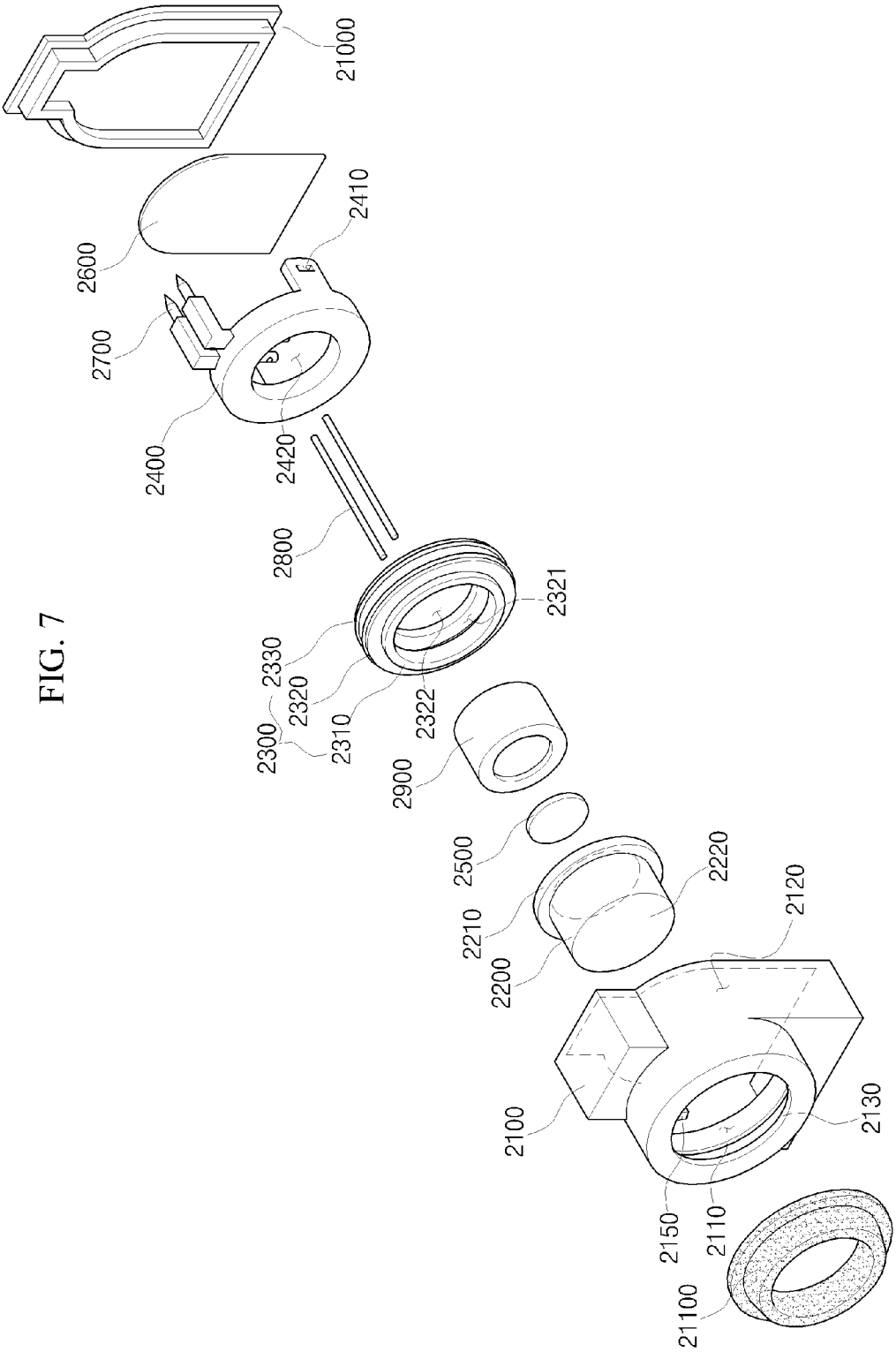
FIG. 7 is an exploded perspective view illustrating the ultrasonic sensor assembly according to the second embodiment of the present invention.

FIG. 5 is a perspective view illustrating an ultrasonic sensor assembly according to a second embodiment of the present invention, FIG. 6 is a cross-sectional view taken along line B-B' of FIG. 5, and FIG. 7 is an exploded perspective view illustrating the ultrasonic sensor assembly according to the second embodiment of the present invention.

Referring to FIGS. 5 to 7, the ultrasonic sensor assembly according to the second embodiment of the present invention includes a housing 2100 that configures a body, a case 2200 that is disposed in the housing 2100, a fixing member 2300 that couples the case 2200 to the housing 2100, a pressurizing member 2400 that fixes the fixing member 2300 to the housing 2100, a piezo-electric element 2500 that is mounted on an inner bottom portion 2220 formed at one end of the case 2200, a PCB 2600 that is disposed in the housing 2100, an extension pin 2700 that is connected to the PCB 2600, a connection member 2800 that is electrically connected to the piezoelectric element 2500 at one end of the connection member 2800 and connected to the extension pin 2700 at the other end of the connection member 2800, a sound-absorbing material 2900 that is charged into the case 2200, a covering member 21000 that seals the inside of the housing 2100, and a ring rubber 21100 that is disposed in one end direction of the housing 2100.

The housing 2100 is the body that accommodates the case 2200 and various elements. A through hole 2110 is formed in the one end direction of the housing 2100, an accommodating port 2120 is opened and formed in a hollow shape in the other end direction of the housing 2100, and a coupling groove 2140 for coupling the case 2200 is formed in a ring shape at a position, which is separated in the other end direction of the housing 2100 from the through hole 2110, and at an inner side of the housing 2100. A coupling projection 250 that fixes the fixing member 2300 to the housing 2100 is formed at a position which is farther away from the through hole 2110 than the coupling groove 2140 in the other end direction of the housing 2100.

The through hole 2110 is preferably formed in a circular shape, and is a hole which communicates with the accommodating port 2120 and in which the case 2200 is inserted into the housing 2100 through the through hole 1210 and is exposed from the housing 1100.

Therefore, the case 2200 can be easily inserted into the housing 2100 through the accommodating port 2120, and is exposed to outside the housing 2100 through the through hole 2110. Thus, the through hole 2110 enables a signal, which is transmitted/received from the outside of the housing 2100 to the case 2200, to be clearly transmitted/received.

The accommodating port 2120 is a hole into which the case 2200 and various elements are inserted from the outside of the housing 2100.

Therefore, the one end direction and other end direction of the housing 2100 communicate with each other through the through hole 2110 and the accommodating port 2120.

Here, the case 2200 inserted through the accommodating port 2120 is supported by a catching jaw 2130 forming the through hole 2110.

The catching jaw 2130 is formed to protrude in a one end direction inner circumference of the housing 2100, and preferably, at the right angle from an inner surface of the housing 2100, at an inner circumference of the housing 2100.

The case 2200 inserted through the accommodating port 2120 is caught at the catching jaw 2130 in a state in which the case 2200 is exposed to the through hole 2110, and the catching jaw 2130 prevents the case 2200 from deviating in a one end direction of the housing 2100.

The case 2200 is preferably formed in a cylindrical shape to be inserted into the through hole 2110, and the one end direction of the case 2200 is exposed from the through hole 2110.

The other end of the case 2200 is opened and formed in the accommodating port 2120 direction of the housing 2100 to communicate with the inside of the housing 2100, and a bezel 2210 is formed therein.

The bezel 2210 is formed to protrude outward from the other end circumference of the case 2200, and the fixing member 2300 is coupled thereto.

The fixing member 2300 couples the case 2200 to the housing 2100, and is preferably formed of an elastic material. The fixing member 2300 is formed in a cylindrical shape to be coupled to the bezel 2210 of the case 2200, and an inserting groove 2321 is provided at an inner side of the fixing member 2300. Thus, the bezel 2210 of the case 2200 is inserted into the inserting groove 2321.

The maximum diameter of the fixing member 2300 is formed greater than an inner diameter of the through hole 2110.

Therefore, since the maximum diameter of the fixing member 2300 is greater than the inner diameter of the through hole 2110 formed by the catching jaw 2130, one surface of the fixing member 2300 is supported in contact with the other surface of the catching jaw 2130, thereby preventing the fixing member 2300 from deviating in the one end direction of the housing 1100.

The fixing member 2300 includes an extension part 2310 that is inserted into the through hole 2110 and the mounting part 2320 that is disposed at the other end of the extension part 2310.

The extension part 2310 that extends in one end direction of the fixing member 2300, and is disposed between the catching jaw 2130 and an outer circumference surface of the case 2200.

Therefore, the extension part 2310 is disposed between the catching jaw 2130 and the outer circumference surface of the case 2200, and a side surface of the extension part 2310 contacts an inner surface of the through hole 2110 formed by the catching jaw 2130, thus preventing the outer circumference surface of the case 2200 from being damaged by a collision between the inner surface of the through hole 2110 and the outer circumference surface of the case 2200.

The mounting part 2320 is provided in the other end direction of the extension part 2310, and the bezel 2210 is coupled to the inserting groove 2321 formed at the mounting part 2320, thereby enabling the case 2200 to be fixed in one end direction of the housing 2100.

In more detail, one end of the mounting part 2320 is provided to protrude outward from the other end circumference of the extension part 2310, and supported in contact with the catching jaw 2130 of the housing 2100.

Moreover, an outer circumference surface of the mounting part 2320 extends from the one end of the mounting part 2320 to the other end direction of the housing 2100 to contact the inner surface of the housing 2100, and a coupling projection 2330 corresponding to the coupling groove 2140 of the housing 2100 is formed at the outer circumference surface of the mounting part 2320 to be coupled to the housing 2100.

Here, the coupling projection 2330 is formed in a ring shape corresponding to the coupling groove 2140 of the housing 2100, at the outer circumference surface of the fixing member 2300, and thus, the coupling of the coupling groove 2140 and the coupling projection 2330 prevents the fixing member 2300 and the case 2200 coupled to the fixing member 2300 from freely moving inside the housing 2100.

Although it is illustrated in the drawing that the coupling groove 2140 is formed at the inner surface of the housing 2100 and the coupling projection 2330 is formed at the outer circumference surface of the fixing member 2300, when the housing 2100 and the fixing member 2300 are coupled and fixed to each other, the coupling projection 2330 may be formed at the inner side of the housing 2100, and the coupling groove 2140 may be formed at the outer circumference surface of the fixing member 2300.

Moreover, although it is illustrated in the drawing that the coupling groove 2140 is formed at the inner surface of the housing 2100, without the coupling groove 2140 being formed at the inner surface of the housing 2100, the coupling projection 2330 formed at the outer circumference surface of the fixing member 2300 can solely prevent the fixing member 2300 from deviating from the housing 2100.

In more detail, the fixing member 2300 formed of an elastic material has the maximum diameter greater than the inner surface of the housing 2100, and thus, when the fixing member 2300 is inserted into the housing 2100, the coupling projection 2330 of the fixing member 2300 pressurizes the inner surface of the housing 2100, whereby the outer circumference surface of the fixing member 2300 is closely adhered to the inner surface of the housing 2100 by pressurization power of the fixing member 2300.

Therefore, even without the coupling groove 2140 being formed at the inner surface of the housing 2100, the pressurization power of the fixing member 2300 formed of an elastic material can prevent the fixing member 2300 from deviating from the housing 2100.

In addition, it is illustrated in the drawing that each of the coupling groove 2140 and the coupling projection 2330 is formed as two at an inner circumference surface of the housing 2100 or at an outer circumference surface of the fixing member 2300, but if the fixing member 2300 is prevented from deviating from the housing 2100, each of the coupling groove 2140 and the coupling projection 2330 is formed as at least two or more.

The other end of the mounting part 2320 is formed to protrude in a direction from the outer circumference surface to the inner side of the mounting part 2320, one surface of the other end contacts the other end of the case 2200, and the other surface of the other end of the mounting part 2320 contacts one surface of the pressurizing member 2400 that supports the fixing member 2300. A first communication hole 2322 through which the inside of the case 2200 communicates with the inside of the housing 2100 is through-formed.

Therefore, the inserting groove 2321 is formed at the fixing member 2300 by the one end, outer circumference surface, and other end of the mounting part 2320, and the bezel 1210 is inserted by the inserting groove 2321. Thus, the case 2200 is coupled to the fixing member 2300.

Further, one end of the mounting part 2320 of the fixing member 2300 with the case 2200 coupled thereto is supported in contact with the catching jaw 2130 that is formed at the one end of the housing 2100 to protrude in the inner direction of the housing 2100, and thus, the fixing member 2300 and the case 2200 coupled to the fixing member 2300 are prevented from deviating in one end direction of the housing 2100.

Moreover, the fixing member 2300 is formed an elastic material, and thus, when the case 2200 is coupled to the fixing member 2300, the case 2200 can be easily can be coupled to the fixing member 2300 by an elasticity of the elastic material of the fixing member 2300, and the pressurizing member 2400 supports the fixing member 2300 to prevent the fixing member 2300 from deviating in the other end direction of the housing 2100.

One surface of the pressurizing member 2400 is supported in contact with the other end of the fixing member 2300, and a coupling groove 2410 coupled to the coupling projection 250 of the housing 2100 is formed at the other surface of the pressurizing member 2400 such that the pressurizing member 2400 is fixed from the housing 2100.

Therefore, the coupling groove 2410 formed at the other surface of the pressurizing member 2400 is coupled to the coupling projection 250 that is formed to protrude from the housing 2100, and thus, a movement of the pressurizing member 2400 is fixed. Accordingly, the fixing member 2300 contacting the one surface of the pressurizing member 2400 and the case 2200 coupled to the fixing member 2300 are prevented from deviating in the other end direction of the housing 2100.

Here, although it is illustrated in the drawing that the coupling projection 250 of the housing 2100 is coupled to the coupling groove 2410 formed at the other surface of the pressurizing member 2400 and thus prevents the fixing member 2300 and the case 2200 coupled to the fixing member 2300 from deviating in the other end direction of the housing 2100, when the pressurizing member 2400 is disposed at the other surface of the fixing member 2300 and thus can prevent the fixing member 2300 and the case 2200 coupled to the fixing member 2300 from deviating in the other end direction of the housing 2100, the pressurizing member may be fixed to the inside of the housing 2100 by various bonding methods such as thermal bonding, high frequency bonding, etc.

The first communication hole 2322 that communicates the inside of the case 2200 with the accommodating port 2120 is formed at the other end of the fixing member 2300, and a second communication hole 2420 that communicates the inside of the case 2200 with the accommodating port 2120 through the first communication hole 2322 is formed at the pressurizing member 2400. Therefore, the inside of the case 2200 communicates with the inside of the housing 2100, and thus, the piezo-electric element 2500 and the connection member 2800 are accommodated in the case 2200 through the accommodating port 2120 of the housing 2100.

The piezo-electric element 2500 is mounted on the inner bottom portion 2220 formed at the one end of the case 2200, and has the principle that generates a vibration when an electrical signal having a constant or irregular pulse type is applied thereto.

Therefore, an ultrasonic wave is generated and transmitted by a friction (caused by the vibration of the piezo-electric element 2500) between the bottom portion 2220 of the case 2200 and the piezo-electric element 2500, and reflected back from an obstacle near the housing 2100, whereupon the reflected ultrasonic wave is transferred to the PCB 2600.

The PCB 2600 is inserted into the housing 2100 through the accommodating port 2120 of the housing 2100, and a conductive pattern is formed at one side surface or both side surfaces of the PCB 2600. Various circuit elements are mounted on the PCB 2600.

The PCB 2600 may be electrically connected to the connection member 2800 by bonding with the extension pin 2700, and the circuit elements may be mounted on the PCB 2600 by a flip chip type using a conductive adhesive depending on a type of the PCB 2600.

The extension pin 2700 is mounted on the pressurizing member 2400, and preferably, mounted in an insert type in a state in which one end and the other end of the extension pin 2700 are exposed.

Therefore, the extension pin 2700 is inserted into the pressurizing member 2400 in a state in which the one end and other end of the extension pin 2700 are exposed, and thus, a movement of the extension pin 2700 is limited. Therefore, when the extension pin 2700 is connected to the PCB 2600, the one end of the extension pin 2700 is connected to an accurate position, and the other end of the extension pin 2700 is connected to the connection member 2800. Accordingly, the connection member 2800 can be aligned with the PCB 2600 and can maintain an alignment state by the extension pin 2700 fixed to the pressurizing member 2400, and thus can be electrically and accurately connected to the PCB 2600.

The connection member 2800 is inserted into the housing 2100 through the accommodating port 2120 of the housing 2100. The one end of the connection member 2800 is electrically connected to the piezo-electric element 2500, and the other end of the connection member 2800 is connected to the extension pin 2700.

The connection member 2800 is preferably provided as one member. When power is applied to the ultrasonic sensor, the piezo-electric element 2500 vibrates to generate an ultrasonic wave, receives the ultrasonic wave reflected back from an obstacle near the housing 2100 to generate a signal, and transfers the generated signal to the PCB 2600 through the extension pin 2700.

Here, when the connection member 2800 can transfer an ultrasonic wave signal generated by the ultrasonic sensor to the PCB 2600, the connection member 2800 may be configured with a lead wire or a flexible printed circuit.

The sound-absorbing material 2900 may be preferably formed by adding a material such as a foaming agent. The sound-absorbing material 2900 is formed and hardened in an internal space of the case 2200 through the other opened end of the case 2200.

Here, when manufacturing the sound-absorbing material 2900, the foaming agent generates a bubble in the sound-absorbing material 2900 to form a hole (caused by a bubble mark) in the sound-absorbing material 2900, ultrasonic waves transferred to the sound-absorbing material 2900 are distributed by the hole formed in the sound-absorbing material 2900, and are prevented from being transferred in the other end direction of the housing 2100.

Moreover, the sound-absorbing material 2900 is charged into and hardened in the internal space of the case 2200, thereby sealing the inside of the case 2200.

Unlike the related art in which the ultrasonic sensor assembly is configured with the case 10, the piezo-electric element 20, the lead wire 40, the sound-absorbing material 50, etc. and a process of coating and hardening the charging material 60 for providing the mounting part 70 with the sound-absorbing material 50 disposed therein is repeatedly performed, the present invention forms and hardens the sound-absorbing material 2900 of the foaming agent at the other opened end of the case 2200, and thus, the sound-absorbing material 2900 can act as both the charging material 60 and the sound-absorbing material 50.

That is, the sound-absorbing material 2900 of the present invention can prevent the number of processes and the manufacturing cost from increasing due to the repeated coating and hardening process of the related art, thus reducing the number of processes and the manufacturing cost.

The covering member 21000 is disposed at the accommodating port 2120 of the housing 2100, and seals the inside of the housing 2100.

Therefore, the covering member 21000 can protect the internal elements of the housing 2100 against a foreign material penetrating from outside the housing 2100, thus extending a service life of the ultrasonic sensor assembly.

The ring rubber 21100 is formed in a truncated-cone shape in which one end and the other end of the ring rubber 21100 pass through each other, and a diameter of the one end is less than that of the other end. The ring rubber 21100 is coupled to the one end circumference surface of the case 2200 protruding from the through hole 2110 of the housing 2100. An inner surface of the ring rubber 21100 contacts the one end direction circumference surface of the case 2200, and the other surface of the ring rubber 21100 contacts the housing 2100 and one surface of the fixing member 2300.

Therefore, the ring rubber 21100 is coupled to the one end direction circumference surface of the case 2200, and thus can protect the case 2200 exposed from the housing 2100 against an external impact and prevent a foreign material from penetrating into the housing 2100.

As described above, various elements, such as the piezo-electric element 2500, the connection member 2800, etc., are sequentially accommodated in the housing 2100 through the accommodating port 2120 of the housing 2100, and thus, a process of assembling a sensor can be simplified, and an automation process of assembling the sensor can be performed.

A detailed assembly process of the present invention is as follows.

First, the piezo-electric 2500 is mounted on the inner bottom portion 2220 of the case 2200, and the fixing member 2300 is coupled to the case 2200 with the piezo-electric element 2500 mounted thereon.

The case 2200 with the fixing member 2300 coupled thereto is inserted into the housing 2100 through the accommodating port 2120 of the housing 2100 in a state in which the case 2200 is exposed in the one end direction of the housing 2100.

At this time, the catching jaw 2130 is formed at the one end of the housing 2100, and the fixing member 2300 is caught at the catching jaw 2130 in the one end direction of the housing 2100, thus preventing the case 2200 coupled to the fixing member 2300 from deviating in the one end direction of the housing 2100.

Further, the pressurizing member 2400 is disposed at the other surface of the fixing member 2300.

In this case, the coupling projection 250 is protrusion-formed at a distance which is separated from the catching jaw 2130 of the housing 2100 in the other end direction of the housing 2100, and the coupling groove 2140 formed at the other surface of the pressurizing member 2400 is coupled to the coupling projection 250 to fix the pressurizing member 2400 to the housing 2100, thus preventing the fixing member 2300 and the case 2200 coupled to the fixing member 2300 from deviating in the one end direction of the housing 2100.

Here, when the pressurizing member 2400 can prevent the fixing member 2300 and the case 2200 coupled to the fixing member 2300 from deviating in the one end direction of the housing 2100, the pressurizing member 2400 may be disposed at the other surface of the fixing member 2300, and fixed to the inside of the housing 2100 in a bonding method.

Moreover, the extension pin 2700 is mounted on the pressurizing member 2400 by an insert method in a state in which the one end and other end of the extension pin 2700 are exposed, in which case the one end of the extension pin 2700 is connected to the PCB 2600, and the other end of the extension pin 2700 is connected to the connection member 2800.

The connection member 2800 is inserted into the case 2200, the PCB 2600 is disposed in the housing 2100, the one end of the connection member 2800 is connected to the piezo-electric element 2500 mounted on the inner bottom portion 2220 of the case 2200, and the other end of the connection member 2800 is connected to the extension pin 2700.

In more detail, by inserting a soldering iron (not shown) into the housing 2100, the one end of the connection member 2800 is connected to the piezo-electric element 2500 by a soldering method, and the other end of the connection member 2800 is connected to the extension pin 2700 by the soldering method.

Subsequently, the sound-absorbing material 2900 is charged into and hardened in the internal space of the case 2200, thereby sealing the inside of the case 2200.

Then, the inside of the housing 2100 is sealed by coupling the covering member 21000 to the other end of the housing 2100, and the ring rubber 21100 is coupled to the outer circumference surface of the case 2200 exposed in the one end direction of the housing 2100.

Therefore, a structure for assembling the sensor is simple, and the elements accommodated in the case 2200 are accommodated sequentially in a direction from the other end to the one end of the housing 2100 through the accommodating port 2120 of the housing 2100, the first communication hole 2322 of the fixing member 2300, and the second communication hole 2420 of the pressurizing member 2400, and thus, an automation process of assembling the sensor can be performed.

Moreover, due to the extension pin 2700 fixed to the pressurizing member 2400, the connection member 2800 is aligned with the PCB 2600, and it is possible to maintain an alignment state. Accordingly, the connection member 2800 can be accurately assembled to the PCB 2600.

Further, the catching jaw 2130 is formed at the inner surface of the housing 2100, and the fixing member 2300 contacts the catching jaw 2130, thus preventing the fixing member 2300 and the case 2200 coupled to the fixing member 2300 from deviating in the other end direction of the housing 2100.

Third Embodiment

Figure 8:
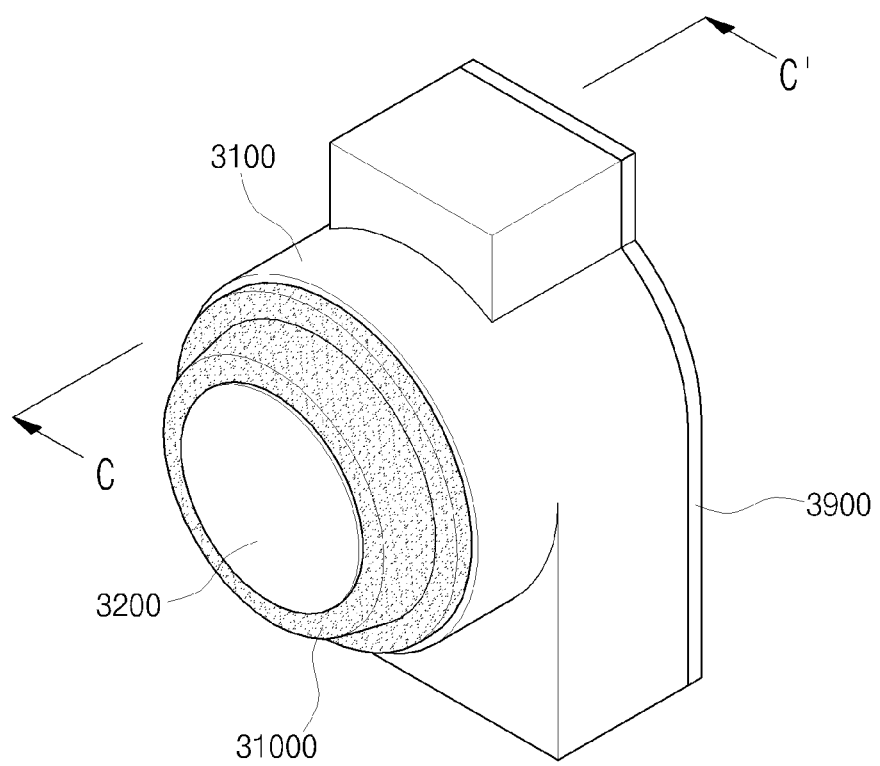
FIG. 8 is a perspective view illustrating an ultrasonic sensor assembly according to a third embodiment of the present invention.
Figure 9:
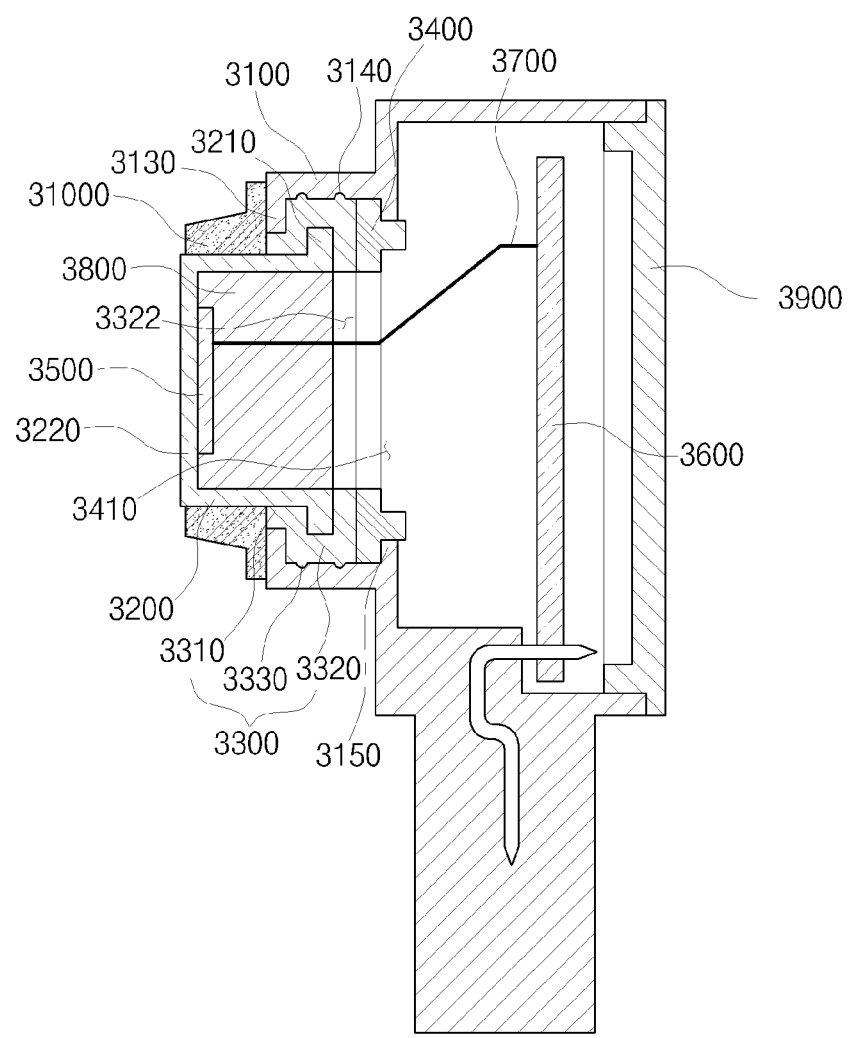
FIG. 9 is a cross-sectional view taken along line C-C' of FIG. 8.
Figure 10:
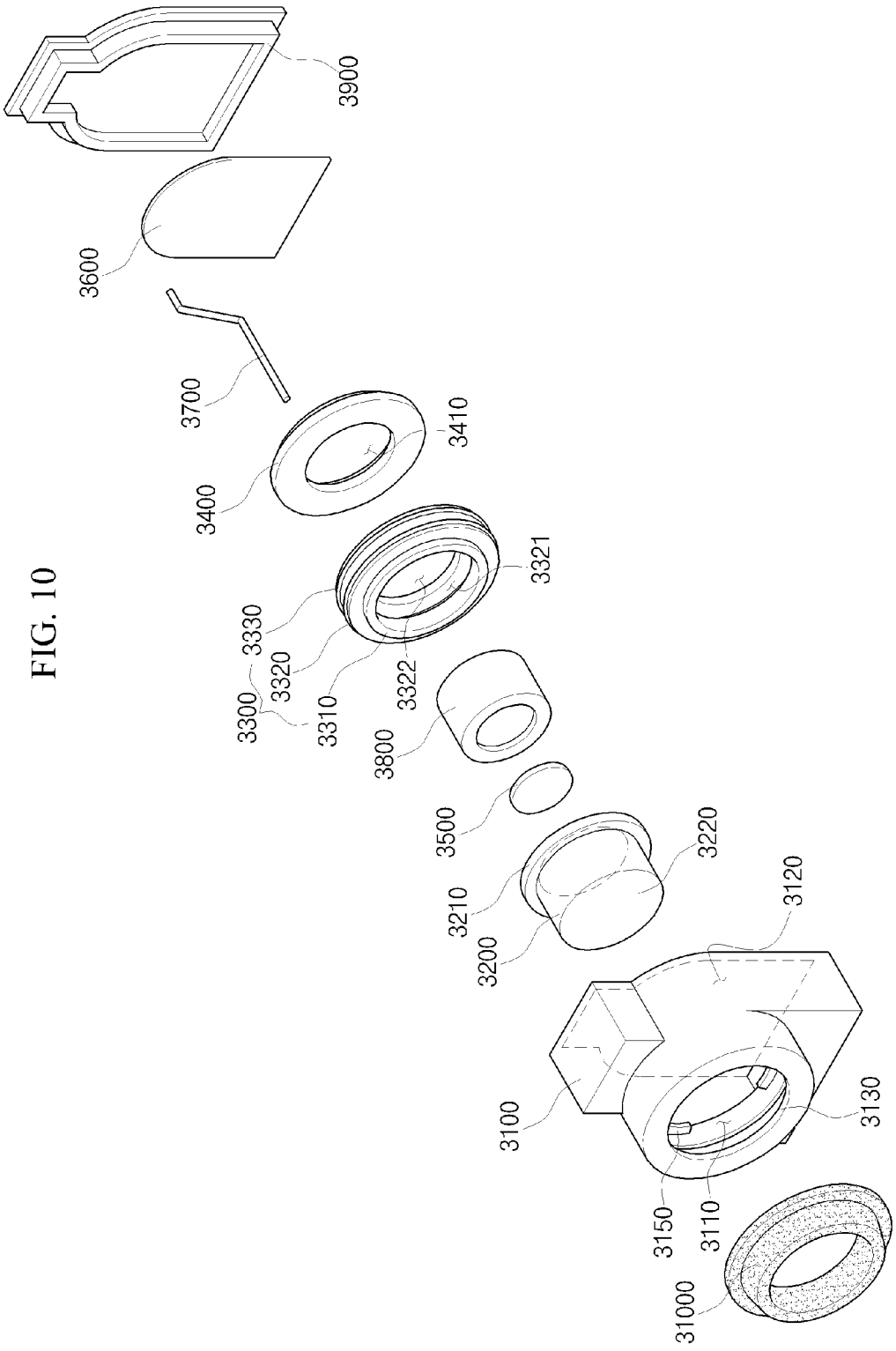
FIG. 10 is an exploded perspective view illustrating the ultrasonic sensor assembly according to the third embodiment of the present invention.

FIG. 8 is a perspective view illustrating an ultrasonic sensor assembly according to a third embodiment of the present invention, FIG. 9 is a cross-sectional view taken along line C-C' of FIG. 8, and FIG. 10 is an exploded perspective view illustrating the ultrasonic sensor assembly according to the third embodiment of the present invention.

Referring to FIGS. 8 to 10, the ultrasonic sensor assembly according to the third embodiment of the present invention includes a housing 3100 that configures a body, a case 3200 that is disposed in the housing 3100, a fixing member 3300 that couples the case 3200 to the housing 3100, a pressurizing member 3400 that fixes the fixing member 3300 to the housing 3100, a piezo-electric element 3500 that is mounted on an inner bottom portion 3220 formed at one end of the case 3200, a PCB 3600 that is disposed in the housing 3100, a connection member 3700 that is electrically connected to the piezo-electric element 3500 at one end of the connection member 3700 and connected to the PCB 3600 at the other end of the connection member 3700, a sound-absorbing material 3800 that is charged into the case 3200, a covering member 3900 that seals the inside of the housing 3100, and a ring rubber 31000 that is disposed in one end direction of the housing 3100.

The housing 3100 is the body that accommodates the case 3200 and various elements. A through hole 3110 is formed in the one end direction of the housing 3100, an accommodating port 3120 is opened and formed in a hollow shape in the other end direction of the housing 3100, and a coupling groove 3140 for coupling the case 3200 is formed in a ring shape at a position, which is separated in the other end direction of the housing 3100 from the through hole 3110, and at an inner side of the housing 3100. A fixing projection 250 that fixes the fixing member 3300 to the housing 3100 is formed at a position which is farther away from the through hole 3110 than the coupling groove 3140 in the other end direction of the housing 3100.

The through hole 3110 is preferably formed in a circular shape, and is a hole which communicates with the accommodating port 3120 and in which the case 3200 is inserted into the housing 3100 through the through hole 3210 and is exposed from the housing 3100.

Therefore, the case 3200 can be easily inserted into the housing 3100 through the accommodating port 3120, and is exposed to outside the housing 3100 through the through hole 3110. Thus, the through hole 3110 enables a signal, which is transmitted/received from the outside of the housing 3100 to the case 3200, to be clearly transmitted/received.

The accommodating port 3120 is a hole into which the case 3200 and various elements are inserted from the outside of the housing 3100.

Therefore, the one end direction and other end direction of the housing 3100 communicate with each other through the through hole 3110 and the accommodating port 3120.

Here, the case 3200 inserted through the accommodating port 3120 is supported by a catching jaw 3130 forming the through hole 3110.

The catching jaw 3130 is formed to protrude in a one end direction inner circumference of the housing 3100, and preferably, at the right angle from an inner surface of the housing 3100, at an inner circumference of the housing 3100.

The case 3200 inserted through the accommodating port 3120 is caught at the catching jaw 3130 in a state in which the case 3200 is exposed to the through hole 3110, and the catching jaw 3130 prevents the case 3200 from deviating in a one end direction of the housing 3100.

The case 3200 is preferably formed in a cylindrical shape to be inserted into the through hole 3110, and the one end direction of the case 3200 is exposed from the through hole 3110.

The other end of the case 3200 is opened and formed in the accommodating port 3120 direction of the housing 3100 to communicate with the inside of the housing 3100, and a bezel 3210 is formed therein.

The bezel 3210 is formed to protrude outward from the other end circumference of the case 3200, and the fixing member 3300 is coupled thereto.

The fixing member 3300 couples the case 3200 to the housing 3100, and is preferably formed of an elastic material. The fixing member 3300 is formed in a cylindrical shape to be coupled to the bezel 3210 of the case 3200, and an inserting groove 3321 is provided at an inner side of the fixing member 3300. Thus, the bezel 3210 of the case 3200 is inserted into the inserting groove 3321.

The maximum diameter of the fixing member 3300 is formed greater than an inner diameter of the through hole 3110.

Therefore, since the maximum diameter of the fixing member 3300 is greater than the inner diameter of the through hole 3110 formed by the catching jaw 3130, one surface of the fixing member 3300 is supported in contact with the other surface of the catching jaw 3130, thereby preventing the fixing member 3300 from deviating in the one end direction of the housing 3100.

The fixing member 3300 includes an extension part 3310 that is inserted into the through hole 3110 and the mounting part 3320 that is disposed at the other end of the extension part 3310.

The extension part 3310 that extends in one end direction of the fixing member 3300, and is disposed between the catching jaw 3130 and an outer circumference surface of the case 3200.

Therefore, the extension part 3310 is disposed between the catching jaw 3130 and the outer circumference surface of the case 3200, and a side surface of the extension part 3310 contacts an inner surface of the through hole 3110 formed by the catching jaw 3130, thus preventing the outer circumference surface of the case 3200 from being damaged by a collision between the inner surface of the through hole 3110 and the outer circumference surface of the case 3200.

The mounting part 3320 is provided in the other end direction of the extension part 3310, and the bezel 3210 is coupled to the inserting groove 3321 formed at the mounting part 3320, thereby enabling the case 3200 to be fixed in one end direction of the housing 3100.

In more detail, one end of the mounting part 3320 is provided to protrude outward from the other end circumference of the extension part 3310, and supported in contact with the catching jaw 3130 of the housing 3100.

Moreover, an outer circumference surface of the mounting part 3320 extends from the one end of the mounting part 3320 to the other end direction of the housing 3100 to contact the inner surface of the housing 3100, and a coupling projection 3330 corresponding to the coupling groove 3140 of the housing 3100 is formed at the outer circumference surface of the mounting part 3320 to be coupled to the housing 3100.

Here, the coupling projection 3330 is formed in a ring shape corresponding to the coupling groove 3140 of the housing 3100, at the outer circumference surface of the fixing member 3300, and thus, the coupling of the coupling groove 3140 and the coupling projection 3330 prevents the fixing member 3300 and the case 3200 coupled to the fixing member 3300 from freely moving inside the housing 3100.

Although it is illustrated in the drawing that the coupling groove 3140 is formed at the inner surface of the housing 3100 and the coupling projection 3330 is formed at the outer circumference surface of the fixing member 3300, when the housing 3100 and the fixing member 3300 are coupled and fixed to each other, the coupling projection 3330 may be formed at the inner side of the housing 3100, and the coupling groove 3140 may be formed at the outer circumference surface of the fixing member 3300.

Moreover, although it is illustrated in the drawing that the coupling groove 3140 is formed at the inner surface of the housing 3100, without the coupling groove 3140 being formed at the inner surface of the housing 3100, the coupling projection 3330 formed at the outer circumference surface of the fixing member 3300 can solely prevent the fixing member 3300 from deviating from the housing 3100.

In more detail, the fixing member 3300 formed of an elastic material has the maximum diameter greater than the inner surface of the housing 3100, and thus, when the fixing member 3300 is inserted into the housing 3100, the coupling projection 3330 of the fixing member 3300 pressurizes the inner surface of the housing 3100, whereby the outer circumference surface of the fixing member 3300 is closely adhered to the inner surface of the housing 3100 by pressurization power of the fixing member 3300.

Therefore, even without the coupling groove 3140 being formed at the inner surface of the housing 3100, the pressurization power of the fixing member 3300 formed of an elastic material can prevent the fixing member 3300 from deviating from the housing 3100.

In addition, it is illustrated in the drawing that each of the coupling groove 3140 and the coupling projection 3330 is formed as two at an inner circumference surface of the housing 3100 or at an outer circumference surface of the fixing member 3300, but if the fixing member 3300 is prevented from deviating from the housing 3100, each of the coupling groove 3140 and the coupling projection 3330 is formed as at least two or more.

The other end of the mounting part 3320 is formed to protrude in a direction from the outer circumference surface to the inner side of the mounting part 3320, one surface of the other end contacts the other end of the case 3200, and the other surface of the other end of the mounting part 3320 contacts one surface of the pressurizing member 3400 that supports the fixing member 3300. A first communication hole 3322 through which the inside of the case 3200 communicates with the inside of the housing 3100 is through-formed.

Therefore, the inserting groove 3321 is formed at the fixing member 3300 by the one end, outer circumference surface, and other end of the mounting part 3320, and the bezel 3210 is inserted by the inserting groove 3321. Thus, the case 3200 is coupled to the fixing member 3300.

Further, one end of the mounting part 3320 of the fixing member 3300 with the case 3200 coupled thereto is supported in contact with the catching jaw 3130 that is formed at the one end of the housing 3100 to protrude in the inner direction of the housing 3100, and thus, the fixing member 3300 and the case 3200 coupled to the fixing member 3300 are prevented from deviating in one end direction of the housing 3100.

Moreover, the fixing member 3300 is formed an elastic material, and thus, when the case 3200 is coupled to the fixing member 3300, the case 3200 can be easily can be coupled to the fixing member 3300 by an elasticity of the elastic material of the fixing member 3300, and the pressurizing member 3400 supports the fixing member 3300 to prevent the fixing member 3300 from deviating in the other end direction of the housing 3100.

One surface of the pressurizing member 3400 is supported in contact with the other end of the fixing member 3300, and the other surface of the pressurizing member 2400 is supported by the fixing projection 250 of the housing 3100.

Therefore, the pressurizing member 3400 is fixed between the fixing member 3300 and the fixing projection 250 of the housing 3100 and in the housing 3100, thus preventing the case 3200 coupled to the fixing member 3300 from deviating in the other end direction of the housing 3100.

Here, although it is illustrated in the drawing that the other surface of the pressurizing member 3400 contacts the fixing projection 250 of the housing 3100 and thus prevents the fixing member 3300 and the case 3200 coupled to the fixing member 3300 from deviating in the other end direction of the housing 3100, when the pressurizing member 3400 is disposed at the other surface of the fixing member 3300 and thus can prevent the fixing member 3300 and the case 3200 coupled to the fixing member 3300 from deviating in the other end direction of the housing 3100, the pressurizing member may be fixed to the inside of the housing 3100 by various bonding methods such as thermal bonding, high frequency bonding, etc.

The first communication hole 3322 that communicates the inside of the case 3200 with the accommodating port 3120 is formed at the other end of the fixing member 3300, and a second communication hole 3410 that communicates the inside of the case 3200 with the accommodating port 3120 through the first communication hole 3322 is formed at the pressurizing member 3400. Therefore, the inside of the case 3200 communicates with the inside of the housing 3100, and thus, the piezo-electric element 3500 and the connection member 3700 are accommodated in the case 3200 through the accommodating port 3120 of the housing 3100.

The piezo-electric element 3500 is mounted on the inner bottom portion 3220 formed at the one end of the case 3200, and has the principle that generates a vibration when an electrical signal having a constant or irregular pulse type is applied thereto.

Therefore, an ultrasonic wave is generated and transmitted by a friction (caused by the vibration of the piezo-electric element 3500) between the bottom portion 3220 of the case 3200 and the piezo-electric element 3500, and reflected back from an obstacle near the housing 3100, whereupon the reflected ultrasonic wave is transferred to the PCB 3600.

The PCB 3600 is inserted into the housing 3100 through the accommodating port 3120 of the housing 3100, and a conductive pattern is formed at one side surface or both side surfaces of the PCB 3600. Various circuit elements are mounted on the PCB 3600.

The PCB 3600 may be electrically connected to the connection member 3700 by bonding, and the circuit elements may be mounted on the PCB 3600 by a flip chip type using a conductive adhesive depending on a type of the PCB 3600.

The connection member 3700 is inserted into the housing 3100 through the accommodating port 3120 of the housing 3100. The one end of the connection member 3700 is electrically connected to the piezo-electric element 3500, and the other end of the connection member 3700 is electrically connected to the PCB 3600.

The connection member 3700 is preferably provided as one member. When power is applied to the ultrasonic sensor, the piezo-electric element 3500 vibrates to generate an ultrasonic wave, receives the ultrasonic wave reflected back from an obstacle near the housing 3100 to generate a signal, and transfers the generated signal to the PCB 3600.

Here, when the connection member 3700 can transfer an ultrasonic wave signal generated by the ultrasonic sensor to the PCB 3600, the connection member 3700 may be configured with a lead wire or a flexible printed circuit.

The sound-absorbing material 3800 may be preferably formed by adding a material such as a foaming agent. The sound-absorbing material 3800 is formed and hardened in an internal space of the case 3200 through the other opened end of the case 3200.

Here, when manufacturing the sound-absorbing material 3800, the foaming agent generates a bubble in the sound-absorbing material 3800 to form a hole (caused by a bubble mark) in the sound-absorbing material 3800, ultrasonic waves transferred to the sound-absorbing material 3800 are distributed by the hole formed in the sound-absorbing material 3800, and are prevented from being transferred in the other end direction of the housing 3100.

Moreover, the sound-absorbing material 3800 is charged into and hardened in the internal space of the case 3200, thereby sealing the inside of the case 3200.

Unlike the related art in which the ultrasonic sensor assembly is configured with the case 10, the piezo-electric element 20, the lead wire 40, the sound-absorbing material 50, etc. and a process of coating and hardening the charging material 60 for providing the mounting part 70 with the sound-absorbing material 50 disposed therein is repeatedly performed, the present invention forms and hardens the sound-absorbing material 3800 of the foaming agent at the other opened end of the case 3200, and thus, the sound-absorbing material 3800 can act as both the charging material 60 and the sound-absorbing material 50.

That is, the sound-absorbing material 3800 of the present invention can prevent the number of processes and the manufacturing cost from increasing due to the repeated coating and hardening process of the related art, thus reducing the number of processes and the manufacturing cost.

The covering member 3900 is disposed at the accommodating port 3120 of the housing 3100, and seals the inside of the housing 3100.

Therefore, the covering member 3900 can protect the internal elements of the housing 3100 against a foreign material penetrating from outside the housing 3100, thus extending a service life of the ultrasonic sensor assembly.

The ring rubber 31000 is formed in a truncated-cone shape in which one end and the other end of the ring rubber 31000 pass through each other, and a diameter of the one end is less than that of the other end. The ring rubber 31000 is coupled to the one end circumference surface of the case 3200 protruding from the through hole 3110 of the housing 3100. An inner surface of the ring rubber 31000 contacts the one end direction circumference surface of the case 3200, and the other surface of the ring rubber 31000 contacts the housing 3100 and one surface of the fixing member 3300.

Therefore, the ring rubber 31000 is coupled to the one end direction circumference surface of the case 3200, and thus can protect the case 3200 exposed from the housing 3100 against an external impact and prevent a foreign material from penetrating into the housing 3100.

As described above, various elements, such as the piezo-electric element 3500, the connection member 3700, etc., are sequentially accommodated in the housing 3100 through the accommodating port 3120 of the housing 3100, and thus, a process of assembling a sensor can be simplified, and an automation process of assembling the sensor can be performed.

A detailed assembly process of the present invention is as follows.

First, the piezo-electric 3500 is mounted on the inner bottom portion 3220 of the case 3200, and the fixing member 3300 is coupled to the case 3200 with the piezo-electric element 3500 mounted thereon.

The case 3200 with the fixing member 3300 coupled thereto is inserted into the housing 3100 through the accommodating port 3120 of the housing 3100 in a state in which the case 3200 is exposed in the one end direction of the housing 3100.

At this time, the catching jaw 3130 is formed at the one end of the housing 3100, and the fixing member 3300 is caught at the catching jaw 3130 in the one end direction of the housing 3100, thus preventing the case 3200 coupled to the fixing member 3300 from deviating in the one end direction of the housing 3100.

Further, the pressurizing member 3400 is disposed at the other surface of the fixing member 3300.

In this case, the fixing projection 250 is protrusion-formed at a distance which is separated from the catching jaw 3130 of the housing 3100 in the other end direction of the housing 3100, and the other surface of the pressurizing member 3400 is supported in the other end direction of the fixing projection 250, thus preventing the fixing member 3300 and the case 3200 coupled to the fixing member 3300 from deviating in the other end direction of the housing 3100.

Here, when the pressurizing member 3400 can prevent the fixing member 3300 and the case 3200 coupled to the fixing member 3300 from deviating in the other end direction of the housing 3100, the pressurizing member 3400 may be disposed at the other surface of the fixing member 3300, and fixed to the inside of the housing 3100 in a bonding method.

Subsequently, the connection member 3700 is inserted into the case 3200, the PCB 3600 is disposed in the housing 3100, the one end of the connection member 3700 is connected to the piezo-electric element 3500 mounted on the inner bottom portion 3220 of the case 3200, and the other end of the connection member 3700 is connected to the PCB 3600.

In more detail, by inserting the soldering iron (not shown) into the housing 3100, the one end of the connection member 3700 is connected to the piezo-electric element 3500 by a soldering method, and the other end of the connection member 3700 is connected to the PCB 3600 by the soldering method.

Further, the sound-absorbing material 3800 is charged into and hardened in the internal space of the case 3200, thereby sealing the inside of the case 3200.

Then, the inside of the housing 3100 is sealed by coupling the covering member 3900 to the other end of the housing 3100, and the ring rubber 31000 is coupled to the outer circumference surface of the case 3200 exposed in the one end direction of the housing 3100.

Therefore, a structure for assembling the sensor is simple, and the elements accommodated in the case 3200 are accommodated sequentially in a direction from the other end to the one end of the housing 3100 through the accommodating port 3120 of the housing 3100, the first communication hole 3322 of the fixing member 3300, and the second communication hole 3410 of the pressurizing member 3400, and thus, an automation process of assembling the sensor can be performed.

Moreover, the connection member 3700 is aligned with the PCB 3600, and it is possible to maintain an alignment state. Accordingly, the connection member 3700 can be accurately assembled to the PCB 3600.

In addition, the catching jaw 3130 is formed at the inner surface of the housing 3100, and the fixing member 3300 contacts the catching jaw 3130, thus preventing the fixing member 3300 and the case 3200 coupled to the fixing member 3300 from deviating in the other end direction of the housing 3100.

Fourth Embodiment

Figure 11:
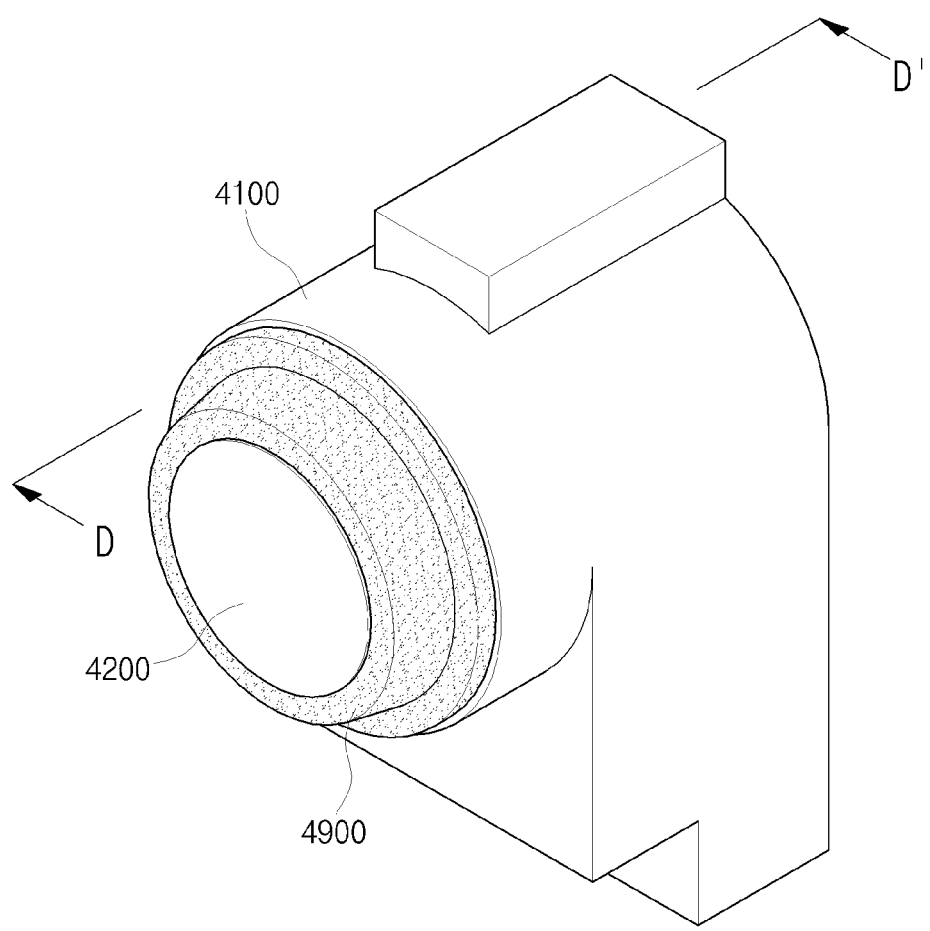
FIG. 11 is a perspective view illustrating an ultrasonic sensor assembly according to a fourth embodiment of the present invention.
Figure 12:
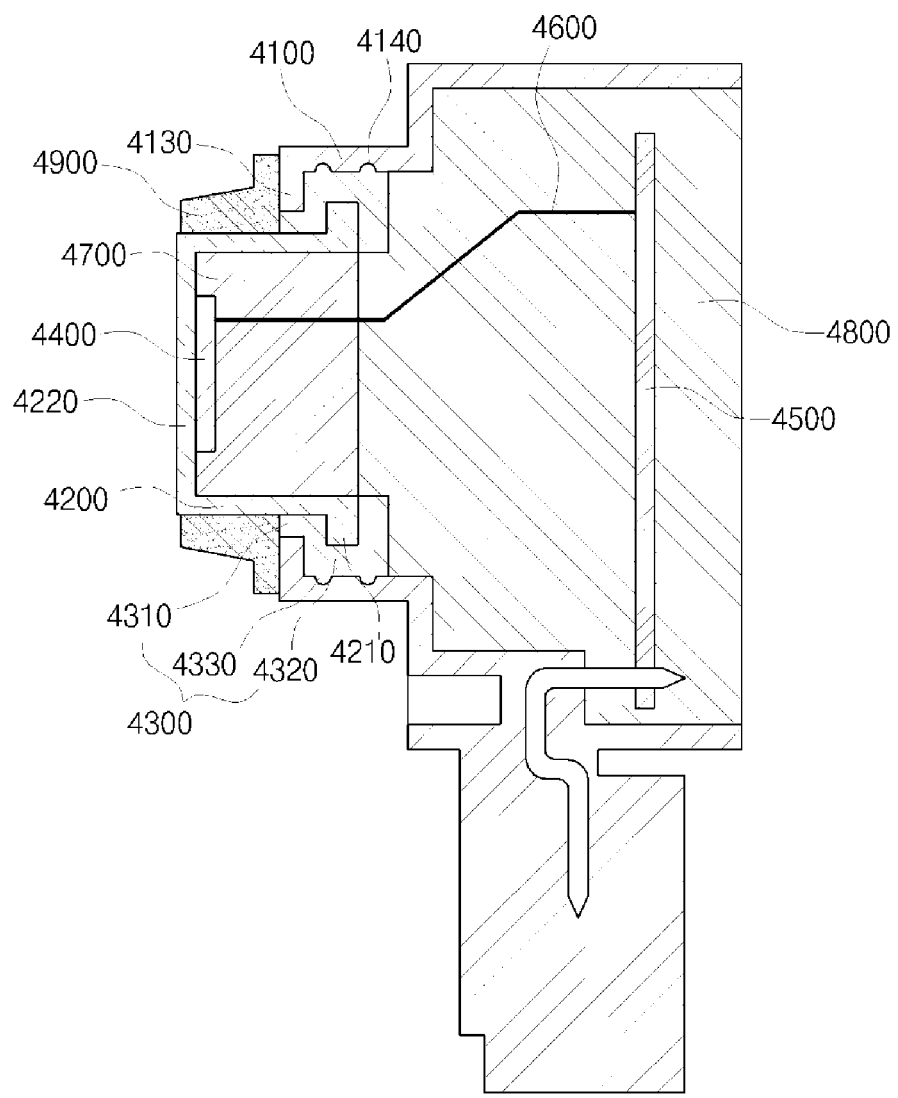
FIG. 12 is a cross-sectional view taken along line D-D' of FIG. 11.
Figure 13:
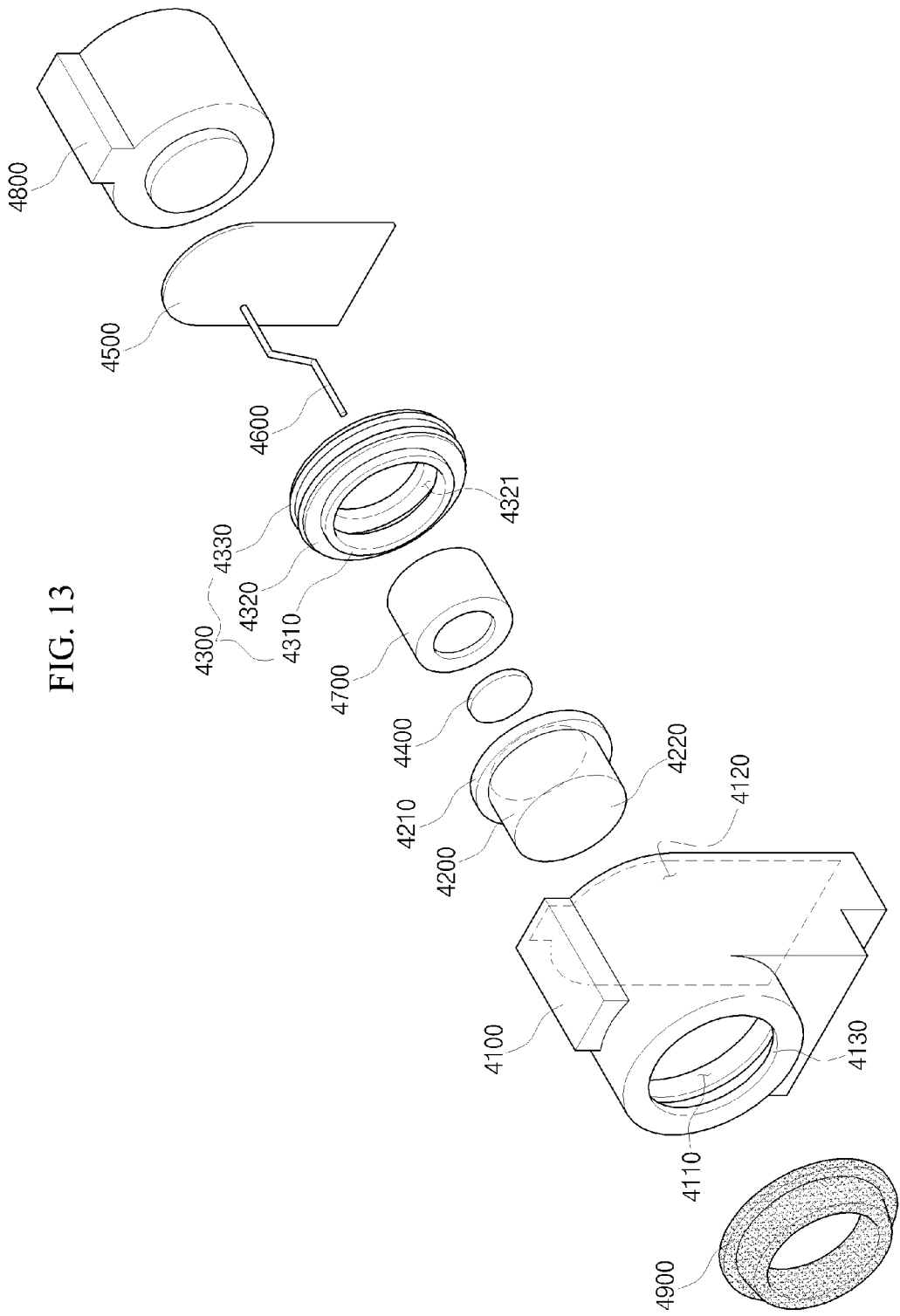
FIG. 13 is an exploded perspective view illustrating the ultrasonic sensor assembly according to the fourth embodiment of the present invention.

FIG. 11 is a perspective view illustrating an ultrasonic sensor assembly according to a fourth embodiment of the present invention, FIG. 12 is a cross-sectional view taken along line D-D' of FIG. 11, and FIG. 13 is an exploded perspective view illustrating the ultrasonic sensor assembly according to the fourth embodiment of the present invention.

Referring to FIGS. 11 to 13, the ultrasonic sensor assembly according to the fourth embodiment of the present invention includes a housing 4100 that configures a body, a case 4200 that is disposed in the housing 4100, a fixing member 4300 that couples the case 4200 to the housing 4100, a piezo-electric element 4400 that is mounted on an inner bottom portion 4220 formed at one end of the case 4200, a PCB 4500 that is disposed in the housing 4100, a connection member 4600 that is electrically connected to the piezo-electric element 4400 at one end of the connection member 4600 and connected to the PCB 4500 at the other end of the connection member 4600, a sound-absorbing material 4700 that is charged into the case 4200, a sealing member 4800 that seals the inside of the housing 4100, and a ring rubber 4100 that is disposed in one end direction of the housing 4100.

The housing 4100 is the body that accommodates the case 4200 and various elements. A through hole 4110 is formed in the one end direction of the housing 4100, and a coupling groove 4140 for coupling the case 4200 is formed in a ring shape at a position, which is separated in the other end direction of the housing 4100 from the through hole 4110, and at an inner side of the housing 4100. The housing 4110 is provided in a hollow shape in which the accommodating port 4120 is opened and formed, in the other end direction of the housing 4100.

The through hole 4110 is preferably formed in a circular shape, and is a hole which communicates with the accommodating port 4120 and in which the case 4200 is inserted into the housing 4100 through the through hole 4210 and is exposed from the housing 4100.

Therefore, the case 4200 can be easily inserted into the housing 4100 through the accommodating port 4120, and is exposed to outside the housing 4100 through the through hole 4110. Thus, the through hole 4110 enables a signal, which is transmitted/received from the outside of the housing 4100 to the case 4200, to be clearly transmitted/received.

The accommodating port 4120 is a hole into which the case 4200 and various elements are inserted from the outside of the housing 4100.

Therefore, the one end direction and other end direction of the housing 4100 communicate with each other through the through hole 4110 and the accommodating port 4120.

Here, the case 4200 inserted through the accommodating port 4120 is supported by a catching jaw 4130 forming the through hole 4110.

The catching jaw 4130 is formed to protrude in a one end direction inner circumference of the housing 4100, and preferably, at the right angle from an inner surface of the housing 4100, at an inner circumference of the housing 4100.

The case 4200 inserted through the accommodating port 4120 is caught at the catching jaw 4130 in a state in which the case 4200 is exposed to the through hole 4110, and the catching jaw 4130 prevents the case 4200 from deviating in a one end direction of the housing 4100.

The case 4200 is preferably formed in a cylindrical shape to be inserted into the through hole 4110, and the one end direction of the case 4200 is exposed from the through hole 4110.

The other end of the case 4200 is opened and formed in the accommodating port 4120 direction of the housing 4100 to communicate with the inside of the housing 4100, and a bezel 4210 is formed therein.

The bezel 4210 is formed to protrude outward from the other end circumference of the case 4200, and the fixing member 4300 is coupled thereto.

The fixing member 4300 couples the case 4200 to the housing 4100, and is preferably formed of an elastic material. The fixing member 4300 is formed in a cylindrical shape to be coupled to the bezel 4210 of the case 4200, and an inserting groove 4321 is provided at an inner side of the fixing member 4300. Thus, the bezel 4210 of the case 4200 is inserted into the inserting groove 4321.

The maximum diameter of the fixing member 4300 is formed greater than an inner diameter of the through hole 4110.

Therefore, since the maximum diameter of the fixing member 4300 is greater than the inner diameter of the through hole 4110 formed by the catching jaw 4130, one surface of the fixing member 4300 is supported in contact with the other surface of the catching jaw 4130, thereby preventing the fixing member 4300 from deviating in the one end direction of the housing 4100.

The fixing member 4300 includes an extension part 4310 that is inserted into the through hole 4110 and the mounting part 4320 that is disposed at the other end of the extension part 4310.

The extension part 4310 that extends in one end direction of the fixing member 4300, and is disposed between the catching jaw 4130 and an outer circumference surface of the case 4200.

Therefore, the extension part 4310 is disposed between the catching jaw 4130 and the outer circumference surface of the case 4200, and a side surface of the extension part 4310 contacts an inner surface of the through hole 4110 formed by the catching jaw 4130, thus preventing the outer circumference surface of the case 4200 from being damaged by a collision between the inner surface of the through hole 4110 and the outer circumference surface of the case 4200.

The mounting part 4320 is provided in the other end direction of the extension part 4310, and the bezel 4210 is coupled to the inserting groove 4321 formed at the mounting part 4320, thereby enabling the case 4200 to be fixed in one end direction of the housing 4100.

In more detail, one end of the mounting part 4320 is provided to protrude outward from the other end circumference of the extension part 4310, and supported in contact with the catching jaw 4130 of the housing 4100.

Moreover, an outer circumference surface of the mounting part 4320 extends from the one end of the mounting part 4320 to the other end direction of the housing 4100 to contact the inner surface of the housing 4100, and a coupling projection 4330 corresponding to the coupling groove 4140 of the housing 4100 is formed at the outer circumference surface of the mounting part 4320 to be coupled to the housing 4100.

Here, the coupling projection 4330 is formed in a ring shape corresponding to the coupling groove 4140 of the housing 4100, at the outer circumference surface of the fixing member 4300, and thus, the coupling of the coupling groove 4140 and the coupling projection 4330 prevents the fixing member 4300 and the case 4200 coupled to the fixing member 4300 from freely moving inside the housing 4100.

Although it is illustrated in the drawing that the coupling groove 4140 is formed at the inner surface of the housing 4100 and the coupling projection 4330 is formed at the outer circumference surface of the fixing member 4300, when the housing 4100 and the fixing member 4300 are coupled and fixed to each other, the coupling projection 4330 may be formed at the inner side of the housing 4100, and the coupling groove 4140 may be formed at the outer circumference surface of the fixing member 4300.

Moreover, although it is illustrated in the drawing that the coupling groove 4140 is formed at the inner surface of the housing 4100, without the coupling groove 4140 being formed at the inner surface of the housing 4100, the coupling projection 4330 formed at the outer circumference surface of the fixing member 4300 can solely prevent the fixing member 4300 from deviating from the housing 4100.

In more detail, the fixing member 4300 formed of an elastic material has the maximum diameter greater than the inner surface of the housing 4100, and thus, when the fixing member 4300 is inserted into the housing 4100, the coupling projection 4330 of the fixing member 4300 pressurizes the inner surface of the housing 4100, whereby the outer circumference surface of the fixing member 4300 is closely adhered to the inner surface of the housing 4100 by pressurization power of the fixing member 4300.

Therefore, even without the coupling groove 4140 being formed at the inner surface of the housing 4100, the pressurization power of the fixing member 4300 formed of an elastic material can prevent the fixing member 4300 from deviating from the housing 4100.

In addition, it is illustrated in the drawing that each of the coupling groove 4140 and the coupling projection 4330 is formed as two at an inner circumference surface of the housing 4100 or at an outer circumference surface of the fixing member 4300, but if the fixing member 4300 is prevented from deviating from the housing 4100, each of the coupling groove 4140 and the coupling projection 4330 is formed as at least two or more.

The other end of the mounting part 4320 is formed to protrude in a direction from the outer circumference surface to the inner side of the mounting part 4320, and contacts the other end of the case 4200. A communication hole 4322 through which the inside of the case 4200 communicates with the inside of the housing 4100 is formed to pass through the other end of the mounting part 4320.

Therefore, the inserting groove 4321 is formed at the fixing member 4300 by the one end, outer circumference surface, and other end of the mounting part 4320, and the bezel 4210 is inserted by the inserting groove 4321. Thus, the case 4200 is coupled to the fixing member 4300.

Further, one end of the mounting part 4320 of the fixing member 4300 with the case 4200 coupled thereto is supported in contact with the catching jaw 4130 that is formed at the one end of the housing 4100 to protrude in the inner direction of the housing 4100, and thus, the fixing member 4300 and the case 4200 coupled to the fixing member 4300 are prevented from deviating in one end direction of the housing 4100.

Moreover, the fixing member 4300 is formed an elastic material, and thus, when the case 4200 is coupled to the fixing member 4300, the case 4200 can be easily can be coupled to the fixing member 4300 by an elasticity of the elastic material of the fixing member 4300.

In addition, the communication hole 4322 having the same size as the inner diameter of the case 4200 is formed at the other end of the fixing member 4300, and thus, the inside of the case 4200 communicates with the inside of the housing 4100, whereby the piezo-electric element 4400 and the connection member 4600 are accommodated in the case 4200 through the accommodating port 4120 of the housing 4100.

The piezo-electric element 4400 is mounted on the inner bottom portion 4220 formed at the one end of the case 4200, and has the principle that generates a vibration when an electrical signal having a constant or irregular pulse type is applied thereto.

Therefore, an ultrasonic wave is generated and transmitted by a friction (caused by the vibration of the piezo-electric element 4400) between the bottom portion 4220 of the case 4200 and the piezo-electric element 4400, and reflected back from an obstacle near the housing 4100, whereupon the reflected ultrasonic wave is transferred to the PCB 4500.

The PCB 4500 is inserted into the housing 4100 through the accommodating port 4120 of the housing 4100, and a conductive pattern is formed at one side surface or both side surfaces of the PCB 4500. Various circuit elements are mounted on the PCB 4500.

The PCB 4500 may be electrically connected to the connection member 4600 by bonding, and the circuit elements may be mounted on the PCB 4500 by a flip chip type using a conductive adhesive depending on a type of the PCB 4500.

The connection member 4600 is inserted into the housing 4100 through the accommodating port 4120 of the housing 4100. The one end of the connection member 4600 is electrically connected to the piezo-electric element 4400, and the other end of the connection member 4600 is electrically connected to the PCB 4500.

The connection member 4600 is preferably provided as one member. When power is applied to the ultrasonic sensor, the piezo-electric element 4400 vibrates to generate an ultrasonic wave, receives the ultrasonic wave reflected back from an obstacle near the housing 4100 to generate a signal, and transfers the generated signal to the PCB 4500.

Here, when the connection member 4600 can transfer an ultrasonic wave signal generated by the ultrasonic sensor to the PCB 4500, the connection member 4600 may be configured with a lead wire or a flexible printed circuit.

The sound-absorbing material 4700 may be preferably formed by adding a material such as a foaming agent. The sound-absorbing material 4700 is formed and hardened in an internal space of the case 4200 through the other opened end of the case 4200.

Here, when manufacturing the sound-absorbing material 4700, the foaming agent generates a bubble in the sound-absorbing material 4700 to form a hole (caused by a bubble mark) in the sound-absorbing material 4700, ultrasonic waves transferred to the sound-absorbing material 4700 are distributed by the hole formed in the sound-absorbing material 4700, and are prevented from being transferred in the other end direction of the housing 4100.

Moreover, the sound-absorbing material 4700 is charged into and hardened in the internal space of the case 4200, thereby sealing the inside of the case 4200.

Unlike the related art in which the ultrasonic sensor assembly is configured with the case 10, the piezo-electric element 20, the lead wire 40, the sound-absorbing material 50, etc. and a process of coating and hardening the charging material 60 for providing the mounting part 70 with the sound-absorbing material 50 disposed therein is repeatedly performed, the present invention forms and hardens the sound-absorbing material 4700 of the foaming agent at the other opened end of the case 4200, and thus, the sound-absorbing material 4700 can act as both the charging material 60 and the sound-absorbing material 50.

That is, the sound-absorbing material 4700 of the present invention can prevent the number of processes and the manufacturing cost from increasing due to the repeated coating and hardening process of the related art, thus reducing the number of processes and the manufacturing cost.

The sealing member 4800 is injected into an internal space of the housing 4100, and seals the inside of the housing 4100.

Therefore, the sealing member 4800 can protect the internal elements of the housing 4100 against an external impact, shaking, or a foreign material penetrating from outside the housing 4100, thus extending a service life of the ultrasonic sensor assembly.

The ring rubber 4900 is formed in a truncated-cone shape in which one end and the other end of the ring rubber 4900 pass through each other, and a diameter of the one end is less than that of the other end. The ring rubber 4900 is coupled to the one end circumference surface of the case 4200 protruding from the through hole 4110 of the housing 4100. An inner surface of the ring rubber 4900 contacts the one end direction circumference surface of the case 4200, and the other surface of the ring rubber 4900 contacts the housing 4100 and one surface of the fixing member 4300.

Therefore, the ring rubber 4900 is coupled to the one end direction circumference surface of the case 4200, and thus can protect the case 4200 exposed from the housing 4100 against an external impact and prevent a foreign material from penetrating into the housing 4100.

As described above, various elements, such as the piezo-electric element 4400, the connection member 4600, etc., are sequentially accommodated in the housing 4100 through the accommodating port 3120 of the housing 4100, and thus, a process of assembling a sensor can be simplified, and an automation process of assembling the sensor can be performed.

A detailed assembly process of the present invention is as follows.

First, the piezo-electric 4400 is mounted on the inner bottom portion 4220 of the case 4200, and the fixing member 4300 is coupled to the case 4200 with the piezo-electric element 4400 mounted thereon.

The case 4200 with the fixing member 4300 coupled thereto is inserted into the housing 4100 through the accommodating port 4120 of the housing 4100 in a state in which the case 4200 is exposed in the one end direction of the housing 4100.

At this time, the catching jaw 4130 is formed at the one end of the housing 4100, and the fixing member 4300 is caught at the catching jaw 4130 in the one end direction of the housing 4100, thus preventing the case 4200 coupled to the fixing member 4300 from deviating in the one end direction of the housing 4100.

Subsequently, the connection member 4600 is inserted into the case 4200, the PCB 4500 is disposed in the housing 4100, the one end of the connection member 4600 is connected to the piezo-electric element 4400 mounted on the inner bottom portion 4220 of the case 4200, and the other end of the connection member 4600 is connected to the PCB 4500.

In more detail, by inserting the soldering iron (not shown) into the housing 4100, the one end of the connection member 4600 is connected to the piezo-electric element 4400 by a soldering method, and the other end of the connection member 4600 is connected to the PCB 4500 by the soldering method.

Further, the sound-absorbing material 4700 is charged into and hardened in the internal space of the case 4200, thereby sealing the inside of the case 4200.

Then, the inside of the housing 4100 is sealed by charging the sealing member 4800 into the internal space of the housing 4100 and hardening the sealing member 4800, and the ring rubber 4900 is coupled to the outer circumference surface of the case 4200 exposed in the one end direction of the housing 4100.

Therefore, a structure for assembling the sensor is simple, and the elements accommodated in the case 4200 are accommodated sequentially in a direction from the other end to the one end of the housing 4100 through the accommodating port 4120 of the housing 4100 and the communication hole 4322 of the fixing member 4300, and thus, an automation process of assembling the sensor can be performed.

Moreover, the connection member 4600 is aligned with the PCB 4500, and it is possible to maintain an alignment state. Accordingly, the connection member 4600 can be accurately assembled to the PCB 4500.

In addition, the catching jaw 4130 is formed at the inner surface of the housing 4100, and the fixing member 4300 contacts the catching jaw 4130, thus preventing the fixing member 4300 and the case 4200 coupled to the fixing member 4300 from deviating in the other end direction of the housing 4100.

According to the present invention, the front supporting cover is coupled to the outer circumference surface in a one end direction of the housing supports the fixing member coupled to the case, and thus prevents the case from deviating in the one end direction of the housing.

The covering member is coupled to the accommodating port that is opened and formed at the other end of the housing, and maintains a seal of the housing and protects the internal components of the housing against an external foreign material, thus extending a service life of the sensor assembly.

The catching jaw is formed at the inner surface of the housing to contact the fixing member, and prevents the fixing member and the case (which is coupled to the fixing member) from deviating in the other end direction of the housing.

The fixing member which is caught at the catching jaw and formed of an elastic member is coupled to the bezel, and thus, the case can be easily caught at the inside of the housing.

The other surface of the fixing member is supported in contact with the catching jaw which is protrusion-formed in the housing, and the one surface of the fixing member is supported in contact with the supporting part of the front supporting cover, thus preventing the fixing member and the case (which is coupled to the fixing member) from deviating in the other end direction and one end direction of the housing.

The fixing member is fixed to the housing through the coupling groove and the coupling projection which are formed at the housing and the outer circumference surface of the fixing member, and thus prevents the case coupled to the fixing member from freely moving inside the housing.

The ring rubber is coupled to the outer surface in the one end direction of the case, and thus can protect the case exposed from the housing from against an external impact and prevent a foreign material from penetrating into the housing.

Various elements, such as the piezo-electric element, the connection member, etc., are sequentially accommodated in the housing through the accommodating port of the housing, and thus, a process of assembling a sensor can be simplified, and an automation process of assembling the sensor can be performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An ultrasonic sensor assembly comprising:
    a hollow housing, a through hole being through-formed at one end of the housing, and an accommodating port being formed to be opened at the other end;
    a case inserted into and disposed at the through hole;
    a fixing member disposed between one end inner circumference surface of the housing and an outer circumference surface of the case to couple the case to the housing;
    a front supporting cover configured to comprise a side wall that is coupled to one end outer circumference surface of the housing and a supporting part that is formed to be bent in a direction from the side wall to the case and supports one surface of the fixing member;
    a piezo-electric element mounted on an inner bottom portion formed at one end of the case;
    a printed circuit board (PCB) disposed in the housing;
    a connection member, one end of the connection member being electrically connected to the piezo-electric element, and the other end being connected to an extension pin; and
    a sound-absorbing material charged into the case,
    wherein,
    an inner diameter of the supporting part is formed less than a maximum diameter of the fixing member, and one surface of the fixing member is supported by the supporting part, thereby preventing the case coupled to the fixing member from deviating in one end direction of the housing, and
    the extension pin is inserted into the housing in a state in which one end and the other end of the extension pin are exposed from the housing, the one end of the extension pin is connected to the connection member, and the other end of the extension pin is connected to the PCB.

2. The ultrasonic sensor assembly of claim 1, further comprising a covering member coupled to the other end of the housing to seal an inside of the housing.

3. The ultrasonic sensor assembly of claim 1, further comprising a catching jaw formed in the housing to protrude in an inner direction of the housing,
    wherein the fixing member contacts the catching jaw to prevent the fixing member and the case from deviating in the other end direction of the housing.

4. The ultrasonic sensor assembly of claim 1, further comprising a bezel formed at the other end of the case to protrude outward,
    wherein the fixing member is formed of an elastic material, and an inserting groove with the bezel inserted thereinto is formed at the fixing member.

5. The ultrasonic sensor assembly of claim 4, further comprising a catching jaw formed in the housing to protrude an inner direction of the housing, and configured to prevent the fixing member from deviating in the other end direction of the housing.

6. The ultrasonic sensor assembly of claim 5, wherein the fixing member comprises:
    an extension part disposed between an inner circumference surface of the supporting part and an outer circumference surface of the case; and
    a mounting part provided at the other end of the extension part, the inserting groove being formed at an inner surface of the mounting part, one end of the mounting part being supported in contact with the supporting part, an outer circumference surface of the mounting part contacting an inner surface of the housing, and the other end of the mounting part being supported in contact with the catching jaw.

7. The ultrasonic sensor assembly of claim 1, further comprising:
    a coupling groove formed at one of one end direction inner surface of the housing and an outer circumference surface of the fixing member; and
    a coupling projection formed at the other of the one end direction inner surface of the housing and the outer circumference surface of the fixing member, the coupling groove being inserted into the coupling projection.

8. The ultrasonic sensor assembly of claim 7, wherein each of the coupling groove and the coupling projection is formed in a ring shape.

9. The ultrasonic sensor assembly of claim 7, wherein each of the coupling groove and the coupling projection is formed as at least two or more.

10. The ultrasonic sensor assembly of claim 1, further comprising a ring rubber coupled to one end outer circumference surface of the case which protrudes from the through hole of the housing,
    wherein an inner surface of the ring rubber contacts one end direction outer circumference surface of the case, and the other end surface of the ring rubber contacts the supporting part.

11. The ultrasonic sensor assembly of claim 10, wherein the ring rubber is formed in a truncated-cone shape in which one end and the other end of the ring rubber pass through each other, and a diameter of the one end is less than a diameter of the other end.

12. The ultrasonic sensor assembly of claim 1, further comprising a communication hole formed at the other end of the fixing member to communicate an inside of the case with the accommodating port,
  wherein the case is formed to be opened in a direction of the accommodating port of the housing.

13. The ultrasonic sensor assembly of claim 10, wherein the through hole is formed in a circular shape.

* * * * *